US009285479B2

(12) United States Patent
O'Connor et al.

(10) Patent No.: US 9,285,479 B2
(45) Date of Patent: Mar. 15, 2016

(54) SELECTION OF A SUBSET OF GLOBAL NAVIGATION SATELLITE SYSTEM MEASUREMENTS BASED ON RELATION BETWEEN SHIFTS IN TARGET PARAMETERS AND SUM OF RESIDUALS

(71) Applicant: Topcon Positioning Systems, Inc., Livermore, CA (US)

(72) Inventors: Raymond M. O'Connor, Pleasanton, CA (US); Ivan Giovanni Di Federico, Argenta (IT); Sergey Averin, Obninsk (RU); Daniel Milyutin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 560 days.

(21) Appl. No.: 13/920,435

(22) Filed: Jun. 18, 2013

(65) Prior Publication Data

US 2013/0342393 A1 Dec. 26, 2013

Related U.S. Application Data

(60) Provisional application No. 61/661,891, filed on Jun. 20, 2012.

(51) Int. Cl.
*G01S 19/42* (2010.01)
*G01S 19/28* (2010.01)

(52) U.S. Cl.
CPC *G01S 19/28* (2013.01); *G01S 19/42* (2013.01)

(58) Field of Classification Search
CPC .................................. G01S 19/28; G01S 19/42
USPC ......................................................... 701/475
See application file for complete search history.

(56) References Cited

U.S. PATENT DOCUMENTS

| 6,278,404 B1 * | 8/2001 | Niles ....................... | G01S 19/14 |
| | | | 342/357.36 |
| 6,727,850 B2 * | 4/2004 | Park ........................ | G01S 19/42 |
| | | | 342/357.25 |

(Continued)

FOREIGN PATENT DOCUMENTS

EP    2 120 060    11/2009

OTHER PUBLICATIONS

"Minimum of GDOP of Satellite Navigation and Its Applications in ISL Establishment of Walker-δ Constellation"; Songhui Han, Po Chen, Qingming Gui, Jianwen Li, Meng Wei; China Satellite Navigation Conference (CSNC) 2013 Proceedings; vol. 244 of the series Lecture Notes in Electrical Engineering pp. 139-149; Date: May 4, 2013.*

(Continued)

*Primary Examiner* — Gregory C Issing
*Assistant Examiner* — Chuong P Nguyen
(74) *Attorney, Agent, or Firm* — Chiesa Shahinian & Giantomasi PC

(57) ABSTRACT

An optimum measurement subset with a specified number of elements is generated from a set of input global navigation satellite system (GNSS) measurements. A design matrix and a weight matrix are generated. Values of a set of coefficients corresponding to the set of input GNSS measurements are calculated. The value of a specific coefficient is calculated as the ratio of the change in value of the at least one target parameter resulting from the change in value of the specific input GNSS measurement to the change in value of the sum of squared residuals resulting from the change in value of the specific input GNSS measurement. The optimum measurement subset is selected based at least in part on the values of the set of coefficients.

15 Claims, 9 Drawing Sheets

(56) References Cited

U.S. PATENT DOCUMENTS

| | | | | |
|---|---|---|---|---|
| 6,917,330 | B2* | 7/2005 | Ohmura | G01S 19/426 342/357.29 |
| 7,825,855 | B1 | 11/2010 | Nicholson | |
| 2006/0114151 | A1 | 6/2006 | Iwami | |
| 2011/0057833 | A1 | 3/2011 | France et al. | |
| 2013/0002485 | A1* | 1/2013 | Pratt | G01S 19/28 342/357.67 |
| 2013/0342396 | A1* | 12/2013 | O'Connor | G01S 19/05 342/357.42 |

OTHER PUBLICATIONS

M.R. Mosavi, 2011. "Applying Genetic Algorithm to Fast and Precise Selection of GPS Satellites." Asian Journal of Applied Sciences, 4: 229-237.*

"Dilution of Precision Revisited"; Dennis Milbert. Rockville, Maryland. Revised: Navigation, Jan. 14, 2008.*

Miaoyan et al., "Satellite Selection for Multi-Constellation," Aug. 5, 2008, Position Location and Navigation Symposium, Piscataway, NJ, USA, IEEE.

Park et al., "Quasi-Optimal Satellite Selection Algorithm for Real-time Applications," Sep. 14, 2001, Proceedings of the 14th International Technical Meeting of the Satellite Division, ION GPS 2001, pp. 3018-3028, Retrieved from the Internet: URL:http://ion.org/publications/abstract.cfm?articleID=1978, retrieved on Aug. 16, 2013.

Wei et al., "A New Satellite Selection Algorithm for Real-Time Application," May 19, 2012, pp. 2567-2570, Systems and Informatics (ICSAI), 2012 International Conference on, IEEE.

Blanco-Delgado et al., "Satellite Selection Method for Multi-Constellation GNSS Using Convex Geometry," Nov. 1, 2010, IEEE Transactions on Vehicular Technology, IEEE Service Center, Piscataway, NJ, USA, vol. 59, No. 9.

Liu et al., "A Recursive Quasi-Optimal Fast Satellite Selection Method for GNSS Receivers," Sep. 25, 2009, Proceedings of the 22nd International Technical Meeting of the Satellite Division of the Institute of Navigation, ION GNSS 2009, Savannah, GA, Retrieved from the Internet: URL:http://www.ion.org/publications/abstract.cfm?articleID=8618, retrieved on Aug. 16, 2013.

Song et al., "An Algorithm of Selecting More than Four Satellites from GNSS," Jan. 1, 2013, Retrieved from the Internet: URL.www.atlantis-press.com, retrieved on Aug. 16, 2013.

Li et al., "GNSS Satellite Selection Algorithm Revisited: A Weighted Way with Integrity Consideration" In: "China Satellite Navigation Conference (CSNC) 2013 Proceedings", Jan. 1, 2013, Springer Berlin Heidelberg, Berlin, Heidelberg, vol. 244, pp. 173-187.

* cited by examiner

SELECTION OF A SUBSET OF GLOBAL NAVIGATION SATELLITE SYSTEM MEASUREMENTS BASED ON RELATION BETWEEN SHIFTS IN TARGET PARAMETERS AND SUM OF RESIDUALS

CROSS-REFERENCE TO RELATED APPLICATIONS

This application claims the benefit of U.S. Provisional Application No. 61/661,891 filed Jun. 20, 2012, which is incorporated herein by reference in its entirety. This application is related to U.S. patent application Ser. No. 13/920,427 filed Jun. 18, 2013 (now U.S. Pat. No. 9,244,172), which is being filed concurrently herewith and which is herein incorporated by reference in its entirety.

BACKGROUND OF THE INVENTION

The present invention relates generally to global navigation satellite systems, and more particularly to selection of a subset of global navigation satellite system measurements.

Global navigation satellite systems (GNSSs) enable determination of target parameters, such as position, velocity, and time (PVT) for users equipped with receivers of GNSS signals. Currently deployed global navigation satellite systems are the United States Global Positioning System (GPS) and the Russian GLONASS. Other global navigation satellite systems, such as the European GALILEO system, are under development. In a GNSS, a navigation receiver receives and processes radio signals transmitted by satellites located within a line-of-sight of the receiver. The satellite signals comprise carrier signals modulated by pseudo-random binary codes. The receiver measures the time delays of the received signals relative to a local reference clock or oscillator. Code phase measurements enable the receiver to determine the pseudo-ranges between the receiver and the satellites. The pseudo-ranges differ from the actual ranges (distances) between the receiver and the satellites due to an offset between the time scales of the GNSS and the receiver. If signals are received from a sufficiently large number of satellites, then the measured pseudo-ranges can be processed to determine the coordinates and the offset between the time scales of the GNSS and the receiver. This operational mode is referred to as a stand-alone mode, since the measurements are determined by a single receiver. A stand-alone system typically provides meter-level accuracy of positioning.

To improve the accuracy of positioning, differential navigation (DN) systems have been developed. In a DN system, the position of a user is determined relative to a base station, also referred to as a base. The base is typically fixed, and the coordinates of the base are precisely known; for example, by surveying. The base contains a navigation receiver that receives satellite signals and that can determine the corrections to GNSS measurements based on the known base position. In some DN systems, the raw measurements of the base can serve as corrections.

The user, whose position is to be determined, can be stationary or mobile; in a DN system, the user is often referred to as a rover. The rover also contains a navigation receiver that receives GNSS satellite signals. Corrections generated at the base are transmitted to the rover via a communications link. To accommodate a mobile rover, the communications link is often a wireless link. The rover processes the corrections received from the base, along with measurements taken with its own receiver, to improve the accuracy of determining its position. Accuracy is improved in the differential navigation mode because errors incurred by the receiver at the rover and by the receiver at the base are highly correlated. Since the coordinates of the base are accurately known, measurements from the base can be used for calculating corrections, thus compensating the errors at the rover. A DN system provides corrections to pseudo-ranges measured with code phase.

The position determination accuracy of a differential navigation system can be further improved if the pseudo-ranges measured with code phase are supplemented with the pseudo-ranges measured with carrier phase. If the carrier phases of the signals transmitted by the same satellite are measured by both the navigation receiver in the base and the navigation receiver in the rover, processing the two sets of carrier phase measurements can yield a position determination accuracy to within several percent of the carrier's wavelength. A differential navigation system that computes positions based on real-time carrier phase pseudo-range measurements, in addition to the code phase pseudo-range measurements, is often referred to as a real-time kinematic (RTK) system. Processing carrier phase measurements to determine coordinates includes the step of ambiguity resolution; that is, determining the integer number of cycles in these measurements acquired by the navigation receiver from an individual satellite.

Applications based on GNSSs have become increasingly popular as the number of available GNSS satellites has increased and as the cost of GNSS receivers has decreased. Measurements from a minimum of four satellites can determine three-dimensional position and time; however, measurements from additional satellites can be used to improve accuracy. Typically, more than four satellites are in view, and redundant measurements are available. Previous generations of receivers were not capable of tracking all the GNSS satellites in view due to hardware limitations; thus, a subset of the satellites in view had to be selected such that the subset provided the best performance, that is, the best accuracy of the PVT solution. This selection process was equivalent to selecting a subset of measurements from the set of available measurements.

The current generation of receivers do not have such hardware limitations; in addition, they can simultaneously process signals transmitted on different frequency bands (for example, both L1 and L2), and they can simultaneously process signals transmitted from different GNSSs (for example, from both GPS and GLONASS). As the capability to track more signals increases, however, the required computational power of the receiver increases. In general, increased computational power requires more complex hardware, higher power consumption, and higher cost. Selecting an optimum subset of measurements from all available measurements, therefore, is still advantageous for producing receivers with smaller size, lower power consumption, and lower cost.

The general problem addressed herein can then be formulated as follows. The total number of available measurements is N. Assume that, with given constraints of computational resources and computational time, only n measurements (where n is an integer, and n<N) are to be selected for computing target parameters within a specified accuracy. Examples of target parameters include position, velocity, and time. Which subset of n measurements selected from the set of available N measurements will yield the best accuracy for the target parameters? This subset is referred to as the optimum measurement subset for the target parameters.

Several approaches have been used to select the optimum measurement subset. One previous approach is based on analysis of the signal-to-noise ratio (SNR) or signal power. Assume that n measurements are to be selected out of N measurements. Under this approach, all satellite measurements are ranked in accordance with SNR or signal power values. Then, the n measurements with the highest SNR or signal power values are selected and used for further processing.

Another previous approach is based on analysis of satellite elevation angle. Measurements from low-elevation satellites are subject to multipath reflection, refraction, and attenuation arising from various signal obstacles and obstructions. In this approach, the measurements that come from satellites below a particular elevation threshold are rejected, and the measurements that come from satellites above the elevation threshold are retained for calculating positions, velocities, or time.

Approaches based on analysis of SNR, signal power, and elevation angle values have the advantage of requiring relatively low computer resources; however, they do not provide optimum accuracy of the PVT solution.

In contrast with the above approaches, analysis of Dilution of Precision (DOP) values provides selection of the measurements that produce the PVT solution with the best accuracy; however, the DOP approach requires substantially more computer resources. The DOP approach for selecting optimum measurements is summarized below.

The DOP approach is based on a general approach in accordance with the Least Squares Method (LSM). The measurement equation is expressed as:

$$y=Hx, \quad (E1)$$

where:
y is a measurement vector;
X is a vector of unknowns; and
H is a design matrix that relates y and x.

In accordance with the LSM, the vector of unknowns is determined as follows:

$$x=(H^T W H)^{-1} H^T W y. \quad (E2)$$

Here W is a diagonal weight matrix:

$$W = \begin{bmatrix} \sigma_1^{-2} & 0 & \ldots & 0 \\ 0 & \sigma_2^{-2} & \ldots & 0 \\ \ldots & \ldots & \ldots & \ldots \\ 0 & 0 & \ldots & \sigma_N^{-2} \end{bmatrix}, \quad (E3)$$

where:
$\sigma_i$ are coefficients characterizing measurement errors of the i-th element in the y-vector; and
N is the total number of measurements.
The P matrix is introduced as follows:

$$P=(H^T W H)^{-1}. \quad (E4)$$

This P matrix is the solution covariance matrix; it can be used for evaluating solution accuracy based on the relationship between measured parameters, target parameters, and measurement weights. Then, the DOP value is denoted as:

$$DOP = \sqrt{\sum_{i \in [L]} P_{i,i}}, \quad (E5)$$

where:
[L] is an index for the variables used; and
$P_{i,i}$ is the diagonal element of the P matrix.

The weights in (E3) can be assigned in a variety of ways. In one method, User Ranging Accuracy (URA) and the satellite "health" information in the navigation data can be used (J. W. Lavrakis and C. Shank, "A Study into the Use of URA in Satellite Selection," Proceedings of the 49th Annual Meeting of the Institute of Navigation, 1993). In a second method, modeled values of ionospheric and tropospheric delays based on the elevation angle can be applied (P. Chansik et al., "A satellite selection criterion incorporating the effect of elevation angle in GPS positioning", Control Engineering Practice, vol. 4, 1996). In a third method, SNR (Y. Yang, et al, "GDOP results in all-in-view positioning and in four optimum satellites positioning with GPS PRN codes ranging", Position Location and Navigation Symposium, Piscataway, N.J., USA: IEEE, 2004) or signal power (M. C. Moreau, "GPS receiver architecture for autonomous navigation in high earth orbits", Colorado, United States: PhD Thesis, University of Colorado at Boulder, 2001) is used for assigning weights.

There is another commonly used approach for calculating DOP, developed earlier than (E4) above. It relates to a less general case in which all weights are equal to 1, or to a particular value that can be separated as a common factor; the P matrix then reduces to:

$$P=(H^T H)^{-1}. \quad (E6)$$

Depending on the composition of the design matrix and the L index, the following metrics can be used for selecting optimum measurements: Geometrical DOP (GDOP), Position DOP (PDOP), Horizontal DOP (HDOP), Vertical DOP (VDOP), and Time DOP (TDOP). Other metrics can be used as well.

The criterion for measurement selection is based on the following relationship: as the DOP decreases, the accuracy of the PVT solution increases. Thus, n measurements are selected from N available measurements to yield the smallest DOP. This approach for selecting optimum measurements based on DOP analysis is referred to herein as the "classical" approach.

The main drawback of the classical approach is that substantial computational resources are required to compute DOP values for different combinations of measurements. For example, if there is a requirement to select 12 measurements out of 13 measurements, then 13 candidate combinations need to be tested; that number of combinations is generally acceptable. If there is a requirement to select 12 measurements out of 18 measurements, however, then 18,564 candidate combinations need to be tested. This number of combinations is too computationally intensive in practice; especially, if the selection is repeated once per epoch (for example, once per second).

To reduce the computational load, a combination of the three above methods can be applied (that is, selection based on elevation, SNR or signal power, and DOP). One approach to combine all three methods is described in France et al., "Selecting Raw Measurements for Use in Position Computation", U.S. Patent Application Publication No. 2011/0057833. Since a DOP algorithm is still used as part of the overall method, however, the overall method still presents a substantial computational load.

There are additional approaches for selecting a measurement subset with a minimum DOP value. These approaches require fewer computational resources, but they are not reliable. The selected subsets sometimes do provide the minimum DOP value, but sometimes they do not. A popular satellite selection algorithm is called "Lear's simple satellite selection algorithm"; it is more widely known as the "Highest Elevation" algorithm [W. M. Lear, "Proposed Simplified GPS Navigation Filters", Johnson Space Center Internal Note JSC-25468, February, 1992]. The highest satellite is first selected, and then satellites are added according to bestmatch criteria depending on azimuthal separation. The second selected satellite is 90° away from the first; the third selected satellite is perpendicular to the plane formed by the first two; the fourth and the fifth satellites are selected to minimize PDOP. This approach produces reasonably good results with a very small computational load, and it can be extended to selecting more than five satellites.

When selecting four satellites, the optimally selected satellites form a tetrahedron around the receiver. The volume of the tetrahedron is inversely proportional to the corresponding GDOP. Thus, by maximizing the volume, GDOP is minimized (M. Kihara and T. Okada, "A Satellite Selection Method and Accuracy for the Global Positioning System", Journal of Navigation, vol. 31, pp. 8-20, 1984).

Numerous algorithms have been developed based on this approach; however, they are limited to selecting four satellites. An approach described by M. Zhang et al. (M. Zhang et al. "Satellite selection for multi-constellation", Position Location and Navigation Symposium, Piscataway, N.J., USA, IEEE, 2008) accommodates additional satellites. Their approach allows selecting 5 to 16 satellites such that two to five satellites lie at zenith while others are uniformly distributed along the horizon circle. Their simulation results show an average of 5.79% GDOP increase compared with the results calculated with the optimal algorithm, and a 50% GDOP increase in a worst case.

Another approach that permits the selection of any desired number of satellites from those in view is based on the calculation of cost functions for every satellite (C. W. Park and J. P. How, "Quasi-Optimal Satellite Selection Algorithm for Real-Time Applications", Proceedings of the 14th International Technical Meeting of the Satellite Division, ION GPS 2001, 2001, pp. 3018-3028). The cost functions for a particular satellite are calculated as sums of cosines of spatial separation angles between the particular satellite and other satellites. The satellites with minimum cost functions are selected.

Another approach is described in "A Recursive Quasi-optimal Fast Satellite Selection Method for GNSS Receivers" by Min Liu et al., Proceedings of the 22nd International Technical Meeting of The Satellite Division of the Institute of Navigation (ION GNSS 2009), Sep. 22-25, 2009, Savannah, Ga. This approach is based on estimating the DOP values, but, in order to save processing power, it is done sub-optimally. According to this approach, on the first step, each satellite is excluded one-by-one, while the others are retained, and the subset (first subset) with the smallest DOP is selected. On the second step, from the first subset, each satellite is excluded one-by-one, while the others are retained, and the new subset (second subset) with the smallest DOP is selected. The selection process is repeated until the desired number of satellites remain. To reduce processor load, calculation of DOP at each step is done iteratively, based on the results of the previous step.

What is needed is a method for selecting an optimum measurement subset that yields an accuracy for target parameters very close to or equal to the accuracy resulting from the optimum measurement subset determined by the dilution of precision analysis, but requires less computational resources or less computational time than the dilution of precision analysis.

BRIEF SUMMARY OF THE INVENTION

An optimum measurement subset is generated from a set of input global navigation satellite system (GNSS) measurements. The number of input GNSS measurements in the set of input GNSS measurements is a first integer, and the number of input GNSS measurements in the optimum measurement subset is a specified second integer, where the specified second integer is less than the first integer.

The following steps are performed to generate the optimum measurement subset.

The set of input GNSS measurements is received.

A design matrix is generated. The design matrix is based at least in part on partial derivatives of the set of input GNSS measurements with respect to at least one target parameter.

A weight matrix is generated. The weight matrix is based at least in part on measurement errors associated with the set of input GNSS measurements.

Values of a set of coefficients are calculated. Each specific coefficient in the set of coefficients corresponds to a specific input GNSS measurement in the set of input GNSS measurements. The values of the set of coefficients are calculated by performing the following steps for each specific input GNSS measurement in the set of input GNSS measurements:

A change in value of the at least one target parameter resulting from a change in value of the specific input GNSS measurement is calculated. The change is based at least in part on the design matrix and based at least in part on the weight matrix.

A change in value of a sum of squared residuals resulting from a change in value of the specific input GNSS measurement is calculated. The change is based at least in part on the design matrix and based at least in part on the weight matrix.

The value of a specific coefficient is calculated as the ratio of the change in value of the at least one target parameter resulting from the change in value of the specific input GNSS measurement to the change in value of the sum of squared residuals resulting from the change in value of the specific input GNSS measurement.

The optimum measurement subset is selected based at least in part on the values of the set of coefficients.

These and other advantages of the invention will be apparent to those of ordinary skill in the art by reference to the following detailed description and the accompanying drawings.

DETAILED DESCRIPTION

Global navigation satellite systems (GNSSs) can operate in various operational modes. Different operational modes require equipment of different complexities and can determine target parameters (such as position, velocity, and time) with different accuracies. The types and quantities of data to be processed also depend on the operational mode. Several operational modes are summarized below.

Figure 1A:
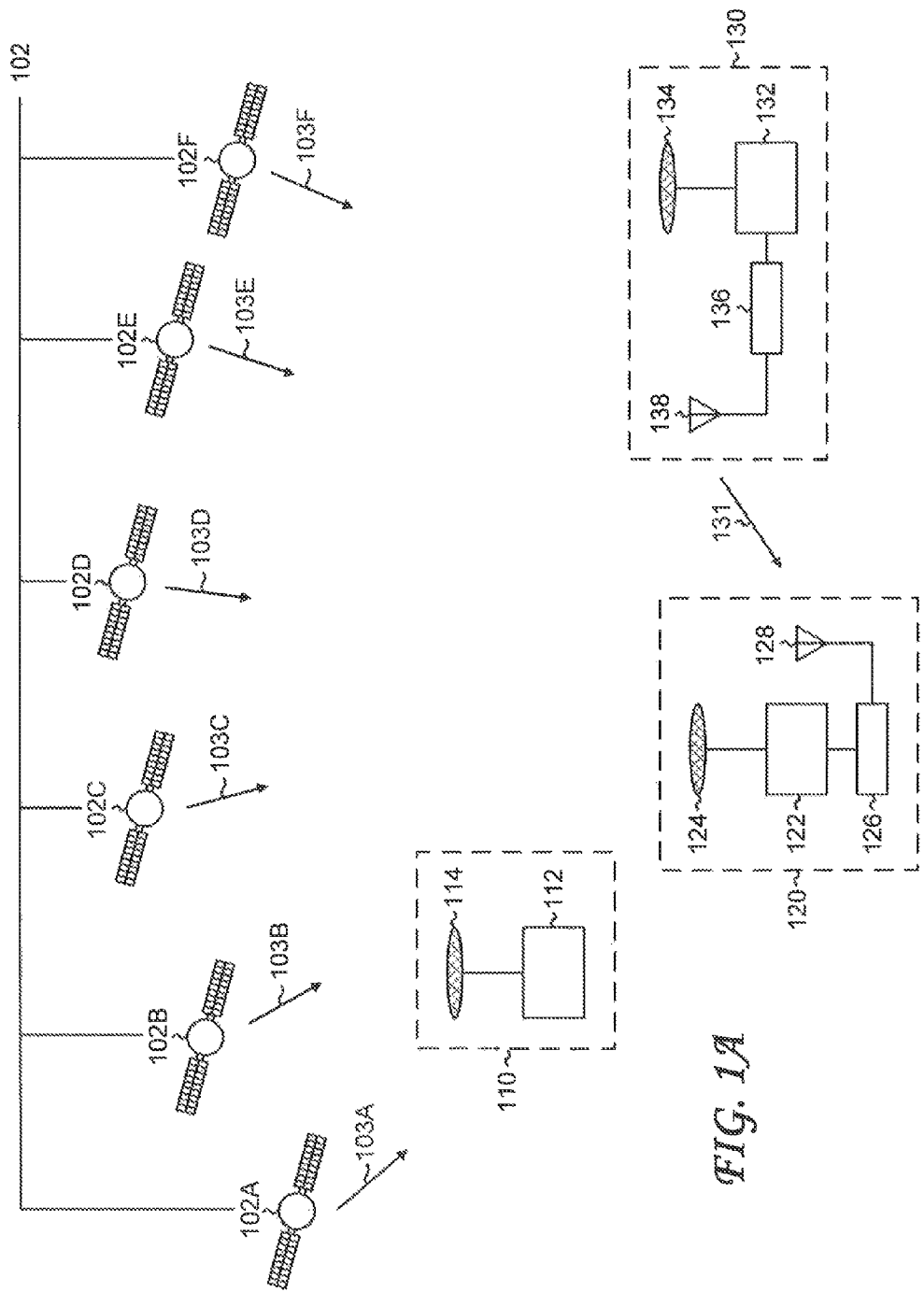
FIG. 1A shows an example of a global navigation satellite system in which the navigation receiver operates in a stand-alone mode or in a single-base-station differential navigation mode.

FIG. 1A shows a high-level schematic of a global navigation satellite system (GNSS). A constellation of global navigation satellites 102 transmits navigation signals. Shown are six representative navigation satellites, denoted navigation satellite 102A-navigation satellite 102F, which transmit navigation signal 103A-navigation signal 103F, respectively. In general, the navigation satellites can belong to more than one global navigation satellite system (for example, GPS and GLONASS).

Refer to the GNSS measurement unit 110, which operates in a stand-alone mode. The GNSS measurement unit 110 includes the antenna 114 and the navigation receiver 112. The antenna 114 receives navigation signals, such as navigation signal 103A-navigation signal 103F; from these navigation signals, the navigation receiver 112 can calculate target parameters, such as time referenced to a GNSS system clock and position and velocity referenced to the antenna 114. In some GNSS measurement units, the antenna is mounted in a fixed relationship with respect to the navigation receiver. If the GNSS measurement unit 110 is carried by a person who is walking or running, the GNSS measurement unit 110 can be used to calculate the position and velocity of the person as a function of time. If the GNSS measurement unit 110 is mounted on a moving vehicle, the GNSS measurement unit 110 can be used to calculate the position and velocity of the vehicle as a function of time.

In other GNSS measurement units, the antenna can be moved with respect to the navigation receiver. In one application, the antenna 114 is mounted on the blade of a bulldozer, and the navigation receiver 112 is mounted inside the cab of the bulldozer; the antenna 114 is coupled to the navigation receiver 112 via a flexible cable. The GNSS measurement unit 110 can then be used to measure the position and velocity of the blade as a function of time. To simplify the discussion below, phrases such as "position of the navigation receiver" or "position and velocity of the navigation receiver" are used; strictly, however, "position" and "velocity" refer to the parameters of the antenna that receives the navigation signals that are then processed by the navigation receiver.

The navigation signals comprise carrier signals modulated by pseudo-random binary codes. The navigation receiver measures the time delays of the received signals relative to a local reference clock or oscillator. Code phase measurements enable the navigation receiver to determine the pseudo-ranges, which in essence are estimates of the distances between the navigation receiver and the navigation satellites. The pseudo-ranges differ from the actual ranges (distances) between the navigation receiver and the navigation satellites due to presence of the term determined by the offset between the time scales of the navigation receiver and the respective GNSS. If navigation signals are received from a sufficiently large number of navigation satellites, then the measured pseudo-ranges can be processed to determine the position of the navigation receiver. In general, the three-dimensional coordinates of the navigation receiver can be determined; a reference Cartesian coordinate (x, y, z) system can be used. The reference Cartesian coordinate system can be an Earth Centered Earth Fixed (ECEF) system; WGS-84 is an example of an ECEF system. Two-dimensional coordinates along a reference horizontal plane (x-y plane) or a one-dimensional coordinate (Z or height) along an axis normal to the reference horizontal plane can also be determined. The reference horizontal plane can, for example, be tangent to the WGS-84 ellipsoid. A time referenced to a GNSS system clock can also be calculated by the navigation receiver from the navigation signals (which contain timing information). Velocity of the navigation receiver can be calculated by several methods; for example, taking the time derivative of position as a function of time, processing Doppler measurements, or processing carrier phase measurements over a specific interval of time.

Various error sources contribute to errors in determination of the position and time. Examples of error sources are satellite clock errors, satellite ephemeris errors, and variations in propagation velocities of the navigation signals. Time scales of the navigation satellites are referenced to precision atomic on-board clocks and are synchronized with the GNSS time scale; however, there are residual drifts and offsets with respect to that GNSS time scale. Calculations of position, velocity, and time using pseudo-ranges require ephemeris data (orbital positions of the satellites); ephemeris data is encoded on the navigation signals, and is updated in real time periodically. Measured pseudo-ranges are affected by the propagation velocity of the navigation signals between the navigation satellites and the navigation receiver. The propagation velocity depends on the medium and varies as the navigation signal travels through the ionosphere and through the troposphere; instabilities in the ionosphere and troposphere can result in dynamic changes to the propagation velocity.

Some errors can be reduced by operating the GNSS in a differential navigation (DN) mode. Refer again to FIG. 1A. The GNSS measurement unit 130, also referred to as the base station (or base) 130, is fixed or stationary; its coordinates are precisely known (for example, from high-precision surveying measurements). The GNSS measurement unit 120, also referred to as the rover 120, in general is mobile.

The base station 130 includes the antenna 134 and the navigation receiver 132. The antenna 134 receives navigation signals, such as navigation signal 103A-navigation signal 103F. The base station 130 also includes the communications transceiver 136 and the antenna 138. Similarly, the rover 120 includes the antenna 124 and the navigation receiver 122. The antenna 124 receives navigation signals, such as navigation signal 103A-navigation signal 103F. The rover 120 also includes the communications transceiver 126 and the antenna 128. The base station 130 transmits the communications signal 131 (for example, a radiofrequency signal) from the antenna 138. The rover 120 receives the communications signal 131 at the antenna 128.

From the received navigation signals, the navigation receiver 132 at the base station 130 can calculate corrections to the received GNSS measurements with respect to the known position of the base station 130. In some DN systems, raw measurements of the base station can serve as corrections. If the distance between the base station 130 and the rover 120 is relatively small, then many of the errors at the base station 130 and at the rover 120 are correlated. The base station 130 transmits error correction data to the rover 120 via the communications signal 131. The error correction data includes data that can be used to correct errors from the various error sources discussed above, for example. The rover 120 processes the navigation signals and the error correction data to determine the position of the rover 120. The accuracy with which the rover 120 can determine its position in the differential navigation mode is higher than the accuracy with which the GNSS measurement unit 110 can determine its position in the stand-alone mode.

A DN system that broadcasts correction data to pseudo-ranges is often referred to as a differential global positioning system (DGPS), or a differential global navigation satellite system (DGNSS). The position determination accuracy of a DN system can be further improved if the pseudo-ranges measured with code phase are supplemented with the pseudo-ranges measured with carrier phase.

If the carrier phases of the signals transmitted by the same satellites are measured by both the navigation receiver in the base station and the navigation receiver in the rover, processing the two sets of carrier phase measurements can yield a location determination accuracy to within several percent of the carrier's wavelength. A DN system that determines positions based on real-time carrier phase pseudo-range measurements, in addition to the code phase pseudo-range measurements, is often referred to as a real-time kinematic (RTK) system. Processing carrier phase measurements to determine position includes the step of ambiguity resolution; that is, determining the integer number of cycles in these measurements acquired by the navigation receiver from an individual satellite.

More complex DN systems, including RTK systems, are configured as network DN systems. In a network DN system, error correction data for a rover is generated from measurements collected from a group of base stations that are geographically dispersed over a wide area. A network control center processes the measurements from the group of base stations and transmits the error correction data to the rover via various communications links, such as radiofrequency satellite signals or General Packet Radio Service (GPRS). Network DN systems can differ by application areas and target positioning accuracy.

Figure 1B:
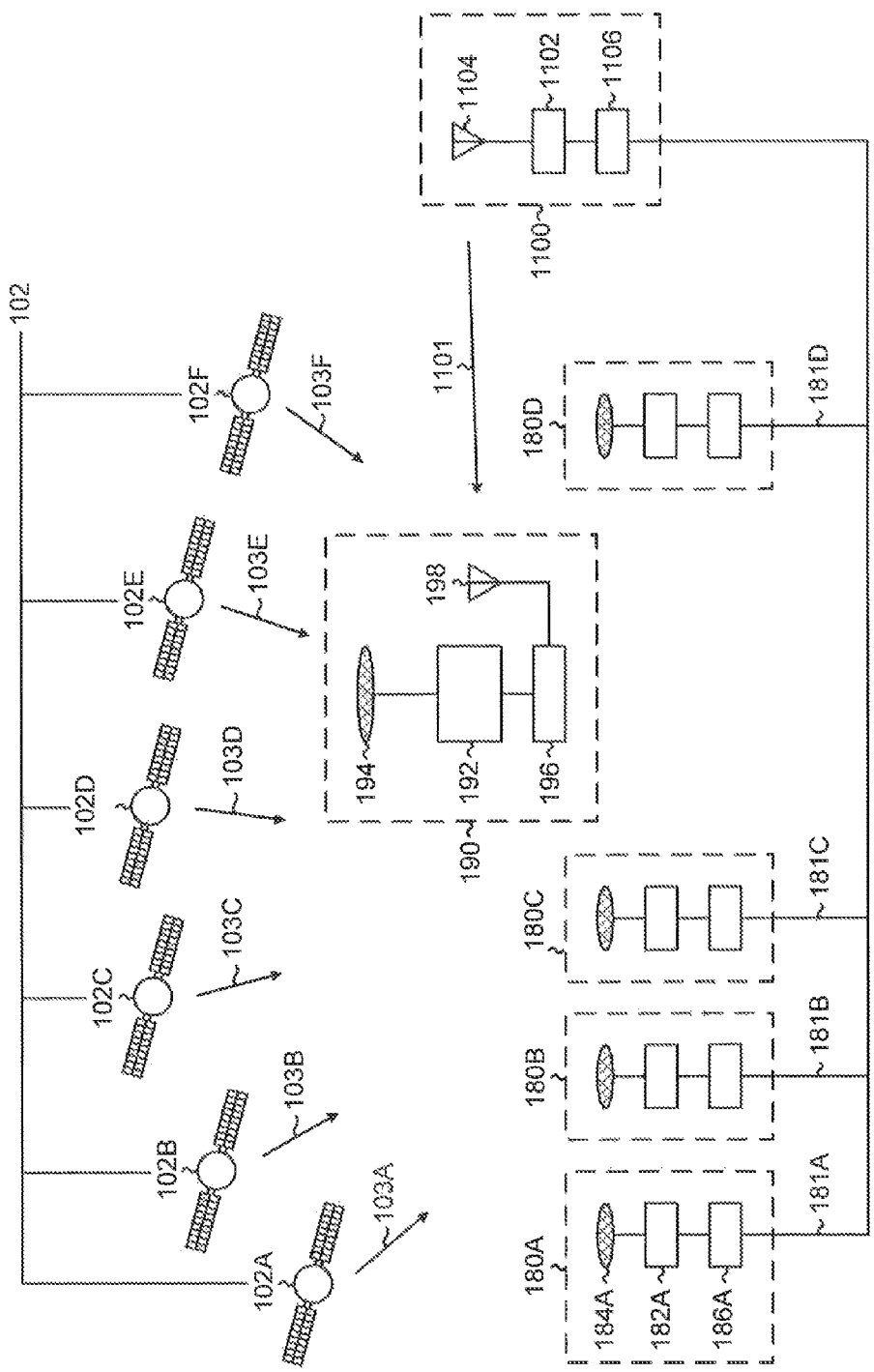
FIG. 1B shows an example of a global navigation satellite system in which the navigation receiver operates in a network differential navigation mode.

FIG. 1B shows an example of a regional (local) network DN system used to provide a network RTK solution; such systems are often referred to as Network RTK systems. Shown are the rover 190 and four representative base stations, denoted base station 180A-base station 180D. The rover 190 includes the antenna 194 and the navigation receiver 192. The antenna 194 receives navigation signals, such as navigation signal 103A-navigation signal 103F. The rover 190 also includes the communications transceiver 196 and the antenna 198. The base station 180A includes the navigation receiver 182A, the antenna 184A, and the data processing and communications unit 186A; base station 180B-base station 180D are each similar to the base station 180A.

In general, the rover and each base station can receive navigation signals from a slightly different subset of navigation satellites in the constellation 102, dependent on observation specifics at the rover and at each base station. Operation of the rover in a RTK mode is possible, however, only using satellite signals received simultaneously by the rover 190 and by at least one of the base stations 180A-180D.

Base station 180A-base station 180D transmit data 181A-data 181D, respectively, to the network control center (NCC) 1100. The data can be transmitted via communications links or via a communications network. The NCC 1100 includes the communications transceiver 1102, the antenna 1104, and the data processing and communications unit 1106. The NCC 1100 receives the data from the base stations as well as the approximate position of the rover and processes these data according to specific algorithms to generate a consolidated set of error correction data corresponding to the rover position (described in more detail below).

The NCC 1100 makes the consolidated set of error correction data available to the rover via various communication channels, such as GPRS. In FIG. 1B, the NCC 1100 delivers the consolidated set of error correction data via the communications signal 1101 (for example, a radiofrequency signal) transmitted from the antenna 1104. The rover 190 receives the communications signal 1101 at the antenna 198. The rover 190 then calculates its position based on measurements collected with its receiver and the consolidated set of error correction data.

The consolidated set of error correction data in network RTK systems can be partitioned into a few groups. The consolidated set of error correction data can include:

Cumulative corrections to both code phase and carrier phase measurements from one or more individual base stations in a group of base stations;

Corrections to code phase and carrier phase measurements for a virtual base station generated from processing GNSS measurements for a group of base stations;

Corrections representing the dispersive part of GNSS measurement errors (measurement errors attributable to the ionosphere) for measurements from one or more individual base stations in a group of base stations;

Corrections representing the non-dispersive part of GNSS measurement errors (measurement errors attributable to the troposphere, satellite ephemeris, and satellite clock data) for measurements from one or more individual base stations in a group of base stations;

Coefficients approximating how various GNSS measurement error components change in space; and Other servicing information.

Figure 1C:
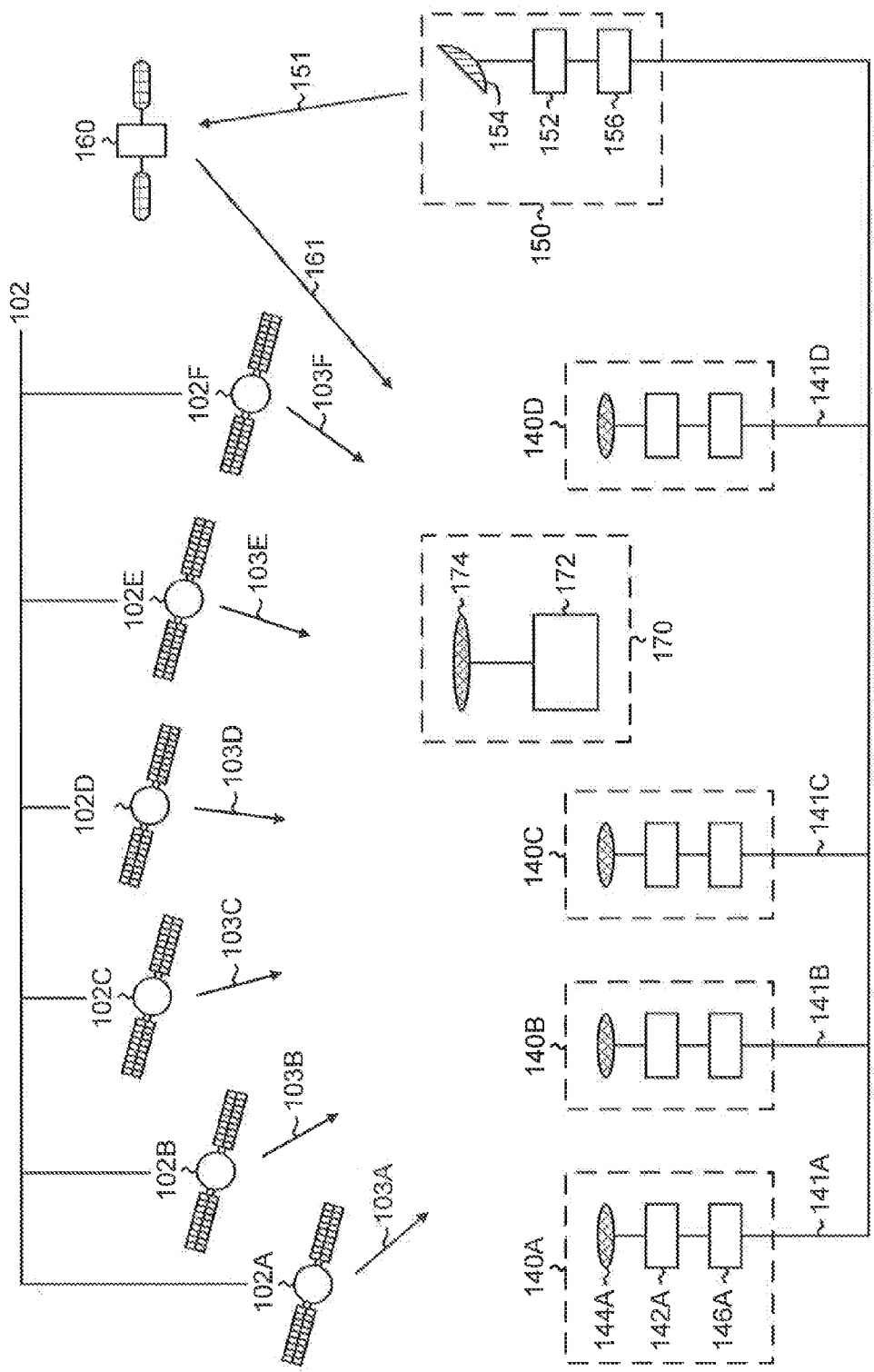
FIG. 1C shows an example of a global navigation satellite system in which the navigation receiver operates in a satellite-based network differential navigation mode.

FIG. 1C shows another example of a network DN system, referred to as a Space Based Augmentation System (SBAS). Shown are the rover 170 and four representative base stations, denoted base station 140A-base station 140D. The rover 170 includes the antenna 174 and the navigation receiver 172. The base station 140A includes the navigation receiver 142A, the antenna 144A, and the data processing and communications unit 146A; base station 140B-base station 140D are each similar to the base station 140A. In general, the rover and each base station can receive navigation signals from a slightly different subset of navigation satellites in the constellation 102, dependent on the specific navigation satellites in view at the rover and at each base station. Operation of the rover in a differential mode is possible, however, only using satellite signals received simultaneously by the rover 170 and by at least one of the base stations 140A-140D.

Base station 140A-base station 140D transmit data 141A-data 141D, respectively, to the network control center (NCC) 150. The data can be transmitted via communications links or via a communications network. The NCC 150 includes the satellite transmitter 152, the antenna 154, and the data processing and communications unit 156. The NCC 150 receives the data from the base stations and processes the data according to specific algorithms to generate a consolidated set of error correction data (described in more detail below). The NCC 150 transmits the consolidated set of error correction data to the geosynchronous (geostationary) relay satellite 160 via the satellite uplink channel 151.

The geosynchronous relay satellite 160 then retransmits the consolidated set of error correction data over a specific region (zone) of the Earth. Multiple geosynchronous relay satellites provide coverage for multiple zones. In FIG. 1C, the rover 170 receives the consolidated set of error correction data from the geosynchronous relay satellite 160 via the satellite signal 161. The rover 170 then calculates its position from the navigation signals and the consolidated set of error correction data. Note that the navigation receiver 172 in the rover 170 needs to be specially equipped to process the satellite signal 161.

The consolidated set of error correction data can be partitioned into a few groups. The consolidated set of error correction data can include:
  Corrections to code phase measurements from one or more individual base stations in a group of base stations;
  Corrections to both code phase and carrier phase measurements from one or more individual base stations in a group of base stations;
  Corrections to orbital (trajectory) parameters and clock parameters of GNSS satellites, specified in the processing of measurements from a group of base stations;
  Corrections to code phase measurements for a virtual base station generated from processing GNSS measurements for a group of base stations;
  Corrections to code phase and carrier phase measurements for a virtual base station generated from processing GNSS measurements for a group of base stations; and
  Other error correction data.

A third example of a network DN system, referred to as Precise Point Positioning (PPP), is similar to network RTK in some aspects, but correction data is presented differently. The architecture of the PPP system is identical to that of the SBAS. Referring to FIG. 1C, a PPP system includes a network of base stations 140A-140D distributed regionally or globally. They send their data to the network control center (NCC) 150. The NCC 150 receives the data from the base stations and processes the data according to specific algorithms to generate a consolidated set of error correction data (described in more detail below). As one option, the NCC 150 can transmit the consolidated set of error correction data to the geosynchronous (geostationary) relay satellite 160 via the satellite uplink channel 151. In another option, the NCC 150 can make the consolidated set of error correction data available to a rover via the Internet.

The key distinction between the PPP system and the typical SBAS, despite similarity in infrastructure, is better accuracy as a result of higher quality of correction data. The SBAS can provide positioning accuracy, on the order of a meter or better; whereas, the PPP system is capable of delivering decimeter level positioning accuracy. In certain cases, PPP correction data sets can make possible carrier phase ambiguity resolution, thus leading to centimeter level positioning accuracy (similar to RTK).

The consolidated set of error correction data in a PPP system can be partitioned into a few groups. The consolidated set of error correction data can include:
  Corrections to orbital (trajectory) parameters of GNSS satellites specified in the processing of measurements from a group of base stations;
  Corrections to clock parameters of GNSS satellites, specified in the processing of measurements from a group of base stations;
  Corrections for residual uncompensated errors of GNSS measurements; and
  Other error correction data.

Each navigation satellite in a global navigation satellite system can transmit signals on one or more frequency bands (for example, on the L1, L2, and L5 frequency bands). To simplify the terminology herein, a navigation receiver is also referred to simply as a receiver. A single-band receiver receives and processes signals on one frequency band (such as L1); a multi-band receiver receives and processes signals on two or more frequency bands (such as L1, L2, and L5). A single-system receiver receives and processes signals from a single GNSS (such as GPS); a multi-system receiver receives and process signals from two or more GNSSs (such as GPS, GLONASS, and GALILEO).

Figure 2:
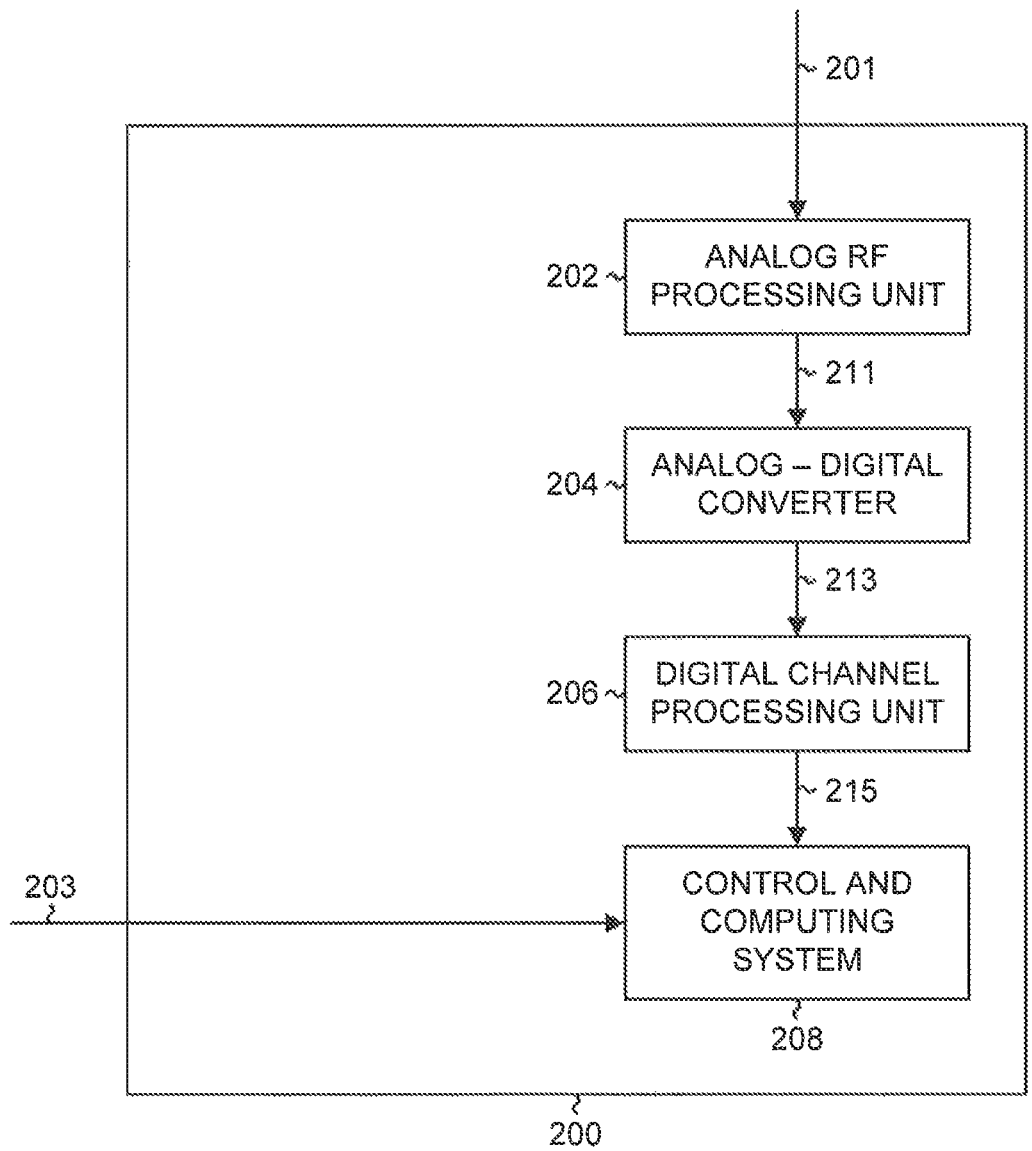
FIG. 2 shows a high level schematic functional block diagram of a navigation receiver.

FIG. 2 shows a high-level schematic functional block diagram of an example of a receiver, denoted as the receiver 200. The input analog signal 201 represents the total signal (also referred to as the combined signal, aggregate signal, or composite signal) of all the navigation signals received by the antenna (not shown) coupled to the receiver 200. For the example shown in FIG. 1A, the input analog signal 201 includes the navigation signal 103A-navigation signal 103F. The input analog signal 201 is first inputted into the analog radiofrequency (RF) processing unit 202. In the analog RF processing unit 202, the input analog signal 201 is amplified by a low-noise amplifier, filtered by a RF bandpass filter, and mixed with a local oscillator signal to generate an intermediate signal with an upconverted frequency and an intermediate signal with a downconverted frequency. An intermediate frequency bandpass filter removes the intermediate signal with the upconverted frequency and outputs the intermediate signal with the downconverted frequency; this output signal is denoted as the output analog signal 211.

The output analog signal 211 is inputted into the analog-digital converter (ADC) 204, which digitizes the analog signal 211. The output digital signal 213 is then inputted into the digital channel processing unit 206, which processes navigation data used for solving navigation tasks. The navigation data includes GNSS information (such as satellite ephemeris and satellite clock parameters) encoded on the navigation signals. The navigation data also includes code phase measurements (that is, delay times used to determine pseudoranges) calculated from delay-locked loops (DLLs). If the navigation receiver processes carrier phases, the navigation data also includes carrier phase measurements calculated from phase-locked loops (PLLs).

The output digital signal 215 is inputted into the control and computing system 208, which computes target parameters such as position, velocity, and time offset. If the receiver operates in a differential navigation mode, the control and computing system 208 receives the error correction data 203, used to compute target parameters with better accuracy. In the single-base-station DN system shown in FIG. 1A, the error correction data 203 would be received from the communications transceiver 126 in the rover 120. In the network DN system shown in FIG. 1B, the error correction data would be received from the communications transceiver 196 in the rover 190. In the network DN system shown in FIG. 1C, the error correction data 203 would be received from the satellite signal 161.

Figure 3:
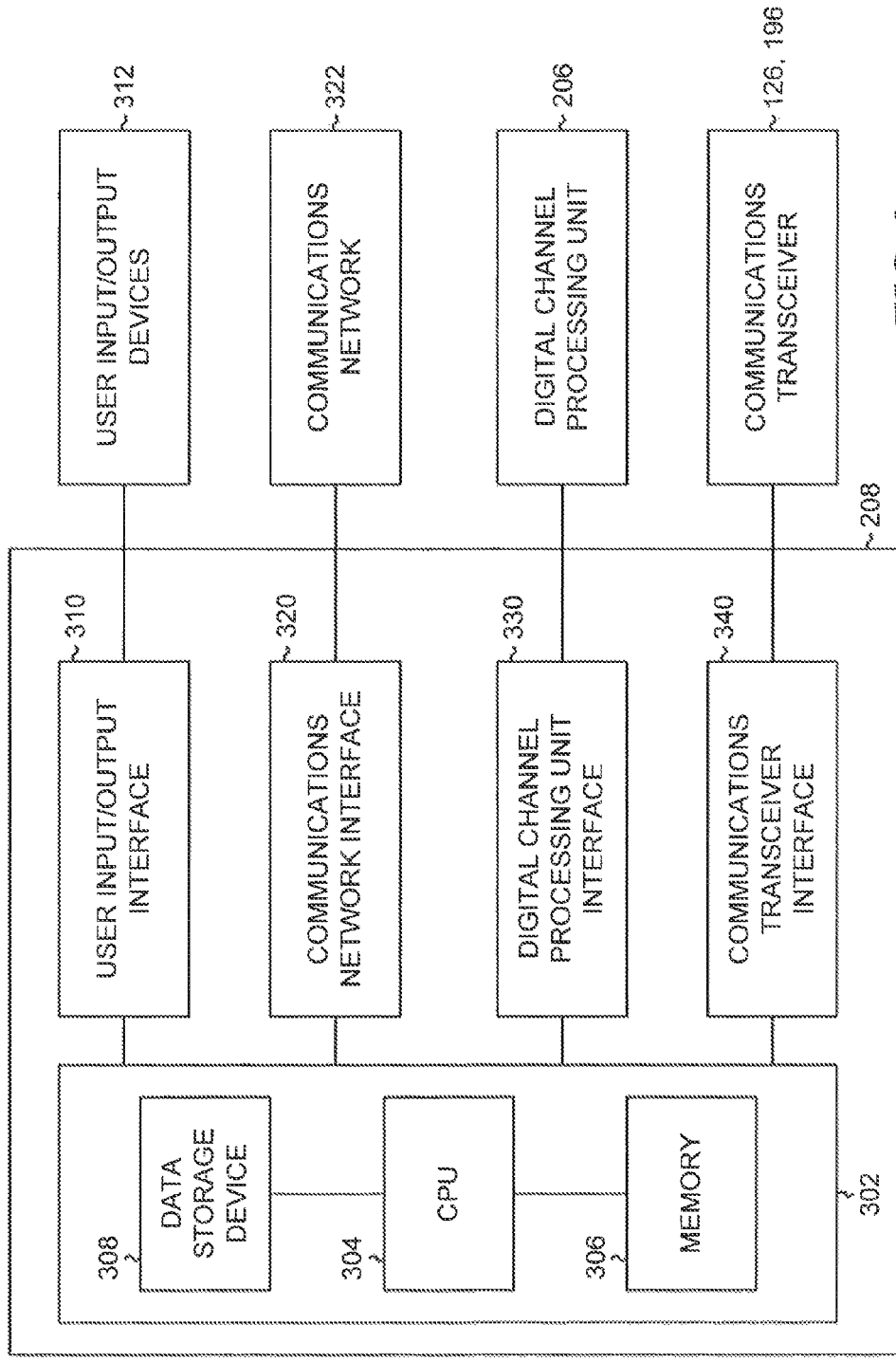
FIG. 3 shows a high level schematic functional block diagram of a control and computing system implemented with a computer.

An embodiment of the control and computing system 208 is shown in FIG. 3. One skilled in the art can construct the control and computing system 208 from various combinations of hardware, firmware, and software. One skilled in the art can construct the control and computing system 208 from various electronic components, including one or more general purpose processors (such as microprocessors), one or more digital signal processors, one or more application-specific integrated circuits (ASICs), and one or more field-programmable gate arrays (FPGAs).

The control and computing system 208 includes a computer 302, which includes a processor [referred to as the central processing unit (CPU)] 304, memory 306, and a data storage device 308. The data storage device 308 includes at least one persistent, non-transitory, tangible computer readable medium, such as non-volatile semiconductor memory, a magnetic hard drive, or a compact disc read only memory.

The control and computing system 208 further includes a user input/output interface 310, which interfaces the computer 302 to user input/output devices 312. Examples of user input/output devices 312 include a keyboard, a mouse, a local access terminal, and a video display. Data, including computer executable code, can be transferred to and from the computer 302 via the user input/output interface 310.

The control and computing system 208 further includes a communications network interface 320, which interfaces the computer 302 with a communications network 322. Examples of the communications network 322 include a local area network and a wide area network. A user can access the computer 302 via a remote access terminal (not shown) communicating with the communications network 322. Data, including computer executable code, can be transferred to and from the computer 302 via the communications network interface 320.

The control and computing system 208 further includes a data channel processing unit interface 330, which interfaces the computer 302 with the digital channel processing unit 206 (see FIG. 2).

The control and computing system 208 further includes a communications transceiver interface 340, which interfaces the computer 302 with a communications transceiver, such as the communications transceiver 126 (see FIG. 1) or the communications transceiver 196 (see FIG. 1B).

As is well known, a computer operates under control of computer software, which defines the overall operation of the computer and applications. The CPU 304 controls the overall operation of the computer and applications by executing computer program instructions that define the overall operation and applications. The computer program instructions can be stored in the data storage device 308 and loaded into the memory 306 when execution of the program instructions is desired. The algorithms described below can be defined by computer program instructions stored in the memory 306 or in the data storage device 308 (or in a combination of the memory 306 and the data storage device 308) and controlled by the CPU 304 executing the computer program instructions. For example, the computer program instructions can be implemented as computer executable code programmed by one skilled in the art to perform algorithms. Accordingly, by executing the computer program instructions, the CPU 304 executes the algorithms described below.

Methods for generating an optimum measurement subset, according to embodiments of the invention, are now described.

At a particular instant in time, assume that the number of GNSS satellites in view is $N_{sat}$, where $N_{sat}$ is an integer, typically greater than or equal to 4. A GNSS satellite is in view if the antenna receives a line-of-sight navigation signal from that satellite. The receiver processes the navigation signals to generate a set of GNSS measurements from the set of GNSS satellites and computes desired target parameters (such as position, velocity, and time) within certain accuracy.

The total number of available GNSS measurements depends on the number of satellites in view and on the number of frequency bands over which GNSS measurements are made for each satellite in view. Assume that the receiver operates over $N_f$ frequency bands, where $N_f$ is an integer greater than or equal to 1. Then the total number of available GNSS measurements is $N=N_f N_{sat}$.

The general problem addressed herein can then be formulated as follows. The total number of available GNSS measurements is N. Assume that, with given constraints of computational resources and computational time, only n GNSS measurements (where n is an integer, and n<N) are to be selected for computing a target parameter within a specified accuracy. Examples of target parameters include position, velocity, and time. Which subset of n GNSS measurements selected from the set of available N GNSS measurements will yield the highest accuracy for the target parameter? This subset is referred to as the optimum measurement subset for the target parameter; to simplify the terminology, this subset is also referred to as the optimum measurement subset. Since the algorithms below use approximations to increase computational efficiency, the algorithms below technically generate a quasi-optimum measurement subset; however, to simplify the terminology, the term "optimum measurement subset" is used.

In embodiments of the invention, the approach for selecting the optimum measurement subset is based on the Least Squares Method (LSM). According to the LSM, the vector of unknowns is determined by the method described by (E1)-(E3). The vector of unknowns corresponds to the target parameters of interest. The vector of residuals r is expressed by:

$$r = y - Hx \qquad (E7)$$
$$= [I - H(H^T W H)^{-1} H^T W] y,$$

where I is the unit matrix. The sum of squared residuals is formed as:

$$S = \Sigma(r_i)^2, \qquad (E8)$$

where $r_i$ is the i-th component of the r vector, and i=1, ..., N.

Assuming a normal distribution law for the measurement errors of the y-vector leads to a normal distribution law for the residuals $r_i$ and a chi-squared ($\chi^2$) distribution for the S value with degrees of freedom equal to m=N−k, where k is the number of unknowns. Also, the value of S shall not exceed a certain threshold corresponding to a particular confidence probability level $\beta$:

$$S \leq \chi_\beta^2(m, 0). \qquad (E9)$$

The S value is commonly used in data processing as a measure of data quality.
If $$S > \chi_\beta^2(m, 0), \qquad (E10)$$

then a hypothesis on the presence of anomalous errors is accepted.

Now consider an instance in which an increasing systematic error is present in only one of the components of the y-vector. This increasing error will lead to an increasing error in the estimated vector of unknowns and, thus, to violating the $\chi^2$-distribution law for the S value. Eventually, the inequality (E10) will be satisfied, and a conclusion on the presence of anomalous errors in the measurement vector can be made.

The rate at which the increasing measurement errors will translate into the estimation of the vector of unknowns, and translate into increasing the S value, directly depends on the geometry of fix. This result can be illustrated with a two-dimensional (2D) example of planar positioning with known distances from reference points with known coordinates.

Figure 4A:
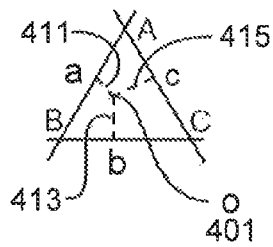
FIG. 4A and FIG. 4B show examples of residuals with a good geometry of fix.
Figure 4B:
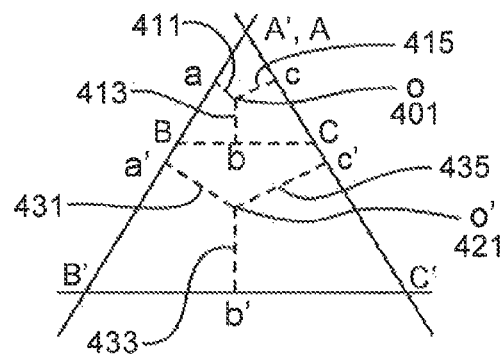

FIG. 4A and FIG. 4B show an example with a good geometry of fix. Lines (AB), (BC), and (AC) in FIG. 4A, and lines (A'B'), (B'C'), and (A'C') in FIG. 4B, represent a set of points equally distant from some three reference points (that is, m=1). These lines are drawn as straight ones for simplicity; but in practice, they are arcs of a circle. Results of LSM adjustment are the o 401 and o' 421 points. Segments [oa] 411, [ob] 413, and [oc] 415 in FIG. 4A, and segments [o'a'] 431, [o'b'] 433, and [o'c'] 435 in FIG. 4B, represent the residuals; that is, the results of LSM adjustment.

FIG. 4A corresponds to the situation in which every measurement contains a particular arbitrary error. FIG. 4B corresponds to the situation in which one of the measurements contains an error leading to a significant shift of the (BC) line. A shift of the (BC) line into the (B'C') line leads to a shift of the o 401 point to the o' 421 point, which leads to a corresponding increase of all the residuals and a corresponding increase in their sum of squares (the S value).

Figure 5A:
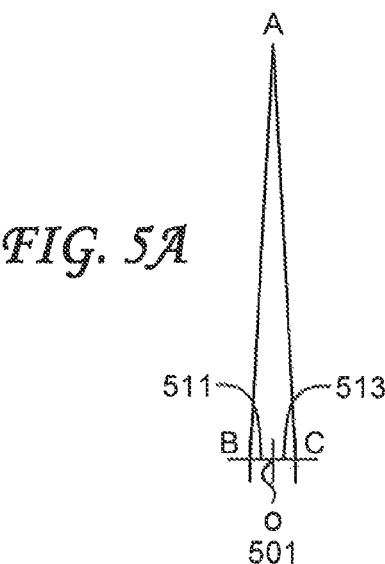
FIG. 5A and FIG. 5B show examples of residuals with a poor geometry of fix.
Figure 5B:
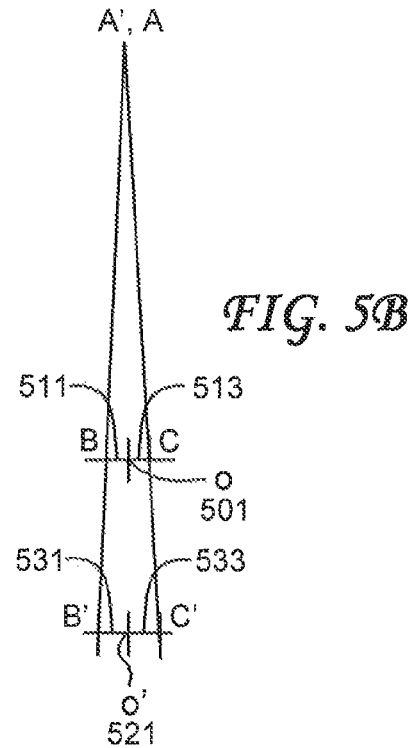

FIG. 5A and FIG. 5B show a similar situation, but, in this example, the geometry of fix is poor. FIG. 5A depicts a situation in which lines (AB) and (AC) are almost parallel. In this situation, the result of fix (that is, the o 501 point) is very close to the (BC) line [or is on the (BC) line, provided the lines (AB) and (AC) are absolutely parallel]; one of the residuals is close to zero; and the others are almost equal to the length of the [oB] 511 and the [oC] 513 segments, respectively.

In the situation shown in FIG. 5B, a shift of the (BC) line into the (B'C') line leads to a significant shift of the fix result from the o 501 point to the o' 521 point. At the same time, the residuals remain almost unchanged; that is, one of them is still close to zero, and the other two are almost equal to the lengths of the [o'B'] 531 and the [o'C'] 533 segments, respectively. Note that the lengths of the [o'B'] 531 and the [o'C'] 533 segments have changed insignificantly with respect to the lengths of the [oB] 511 and the [oC] 513 segments, respectively; that is, despite a significant change of the fix result, the sum of squared residuals (the S value) has changed insignificantly.

Refer back to FIG. 4A and FIG. 4B. Assume that there is a need to exclude one measurement. It is clear that either (AB) or (AC) must be excluded, and (BC) shall be maintained in order to achieve better accuracy of fix. At the same time, the error in the (BC) measurement is capable of providing the biggest positioning error associated with the smallest change in the sum of squared residuals (the S value). Therefore, a particular metric shall be determined that defines the impact of the error in a particular measurement on the S value. The smaller the impact, the more desirable it is to use this particular measurement in positioning.

It follows from (E2) that $$\Delta x = (H^T W H)^{-1} H^T W \Delta y \qquad (E11)$$
$$= K \Delta y,$$

where:
$\Delta x$ is a change of the X-vector due to $\Delta y$, a change of the y-vector; and $$K = (H^T W H)^{-1} H^T W.$$

It follows from (E7) that $$\Delta r = [I - H(H^T W H)^{-1} H^T W] \Delta y \qquad (E12)$$
$$= S \Delta y,$$

where:
$\Delta r$ is a change of the vector of residuals due to $\Delta y$, a change of the y-vector; and $$S = [I - H(H^T W H)^{-1} H^T W].$$

Now assume that a change of the y-vector results from the change of its i-th component only. Rewrite (E11) as follows:

$$\begin{bmatrix} \Delta x_1 \\ \Delta x_2 \\ \cdots \\ \cdots \\ \cdots \\ \Delta x_k \end{bmatrix} = \begin{bmatrix} K_{11} & K_{12} & \cdots & K_{1i} & \cdots & K_{1N} \\ K_{21} & K_{22} & \cdots & K_{2i} & \cdots & K_{2N} \\ \cdots & \cdots & \cdots & \cdots & \cdots & \cdots \\ \cdots & \cdots & \cdots & \cdots & \cdots & \cdots \\ \cdots & \cdots & \cdots & \cdots & \cdots & \cdots \\ K_{k1} & K_{k2} & \cdots & K_{ki} & \cdots & K_{kN} \end{bmatrix} \times \begin{bmatrix} 0 \\ 0 \\ \cdots \\ \Delta y_i \\ \cdots \\ 0 \end{bmatrix}. \qquad (E13)$$

Assume there is interest in evaluating a change in a value that is a function of the components of the vector of unknowns, where the unknowns correspond to the target parameters. For example, if the first three components of the X-vector correspond to spatial coordinates, there can be interest in evaluating the change in the three-dimensional (3D) position ($\Delta D$). Then, the squared change in 3D position is expressed as:

$$\Delta D^2 = \Delta x_1^2 + \Delta x_2^2 + \Delta x_3^2 \qquad (E14)$$
$$= (K_{1i}^2 + K_{2i}^2 + K_{3i}^2) \Delta y_i^2.$$

In the convention used here, $\Delta D^2 = (\Delta D)^2$, and similarly for other values, such as $\Delta x_1^2 = (\Delta x_1)^2$.

In another typical example, assume that the next three components of the X-vector correspond to velocities. In this case, there can be interest in evaluating a change in the 3D velocity vector ($\Delta V$). The formula is then expressed as:

$$\Delta V^2 = \Delta x_4^2 + \Delta x_5^2 + \Delta x_6^2 \qquad (E15)$$
$$= (K_{4i}^2 + K_{5i}^2 + K_{6i}^2) \Delta y_i^2.$$

If (E12) is rewritten similar to (E13), then $$\begin{bmatrix} \Delta r_1 \\ \Delta r_2 \\ \cdots \\ \cdots \\ \cdots \\ \Delta r_N \end{bmatrix} = \begin{bmatrix} S_{11} & S_{12} & \cdots & S_{1i} & \cdots & S_{1N} \\ S_{21} & S_{22} & \cdots & S_{2i} & \cdots & S_{2N} \\ \cdots & \cdots & \cdots & \cdots & \cdots & \cdots \\ \cdots & \cdots & \cdots & \cdots & \cdots & \cdots \\ \cdots & \cdots & \cdots & \cdots & \cdots & \cdots \\ S_{N1} & S_{N2} & \cdots & S_{Ni} & \cdots & S_{NN} \end{bmatrix} \times \begin{bmatrix} 0 \\ 0 \\ \cdots \\ \Delta y_i \\ \cdots \\ 0 \end{bmatrix}. \qquad (E16)$$

Because of the idempotency of the S matrix ($S^T S = S$), the sum of squared residuals can be written as follows:

$$s = r^T r = y^T S y. \qquad (E17)$$

Applying the approach used in (E12), (E14), and (E15), the following equation can be written:

$$\Delta s = S_{ii} \Delta y_i^2, \qquad (E18)$$

where $\Delta S$ is the change in the sum of squared residuals due to the change of the i-th component of the y-vector.

To relate the values $\Delta D^2$ from (E14), or the values $\Delta V^2$ from (E15), to (E18), particular coefficients can be computed, independent of $\Delta y_i$. If the coefficients are denoted as $C_i$, then $$C_{Di} = \Delta D^2/\Delta s = (K_{1i}^2 + K_{2i}^2 + K_{3i}^2)/S_{ii}, \quad (E19)$$

and $$C_{Vi} = \Delta V^2/\Delta s = (K_{4i}^2 + K_{5i}^2 + K_{6i}^2)/S_{ii}, \quad (E20)$$

where $C_{Di}$ and $C_{Vi}$ are the coefficients for position and velocity, respectively.

Assume that the mutual geometry of the user and the satellites in view is constant in time and that the error in the i-th component of the measurement vector is changing; then the coefficients $C_i$ characterize a ratio of a change in the solution to a change in the sum of squared residuals. These coefficients can serve as metrics for selecting the set of measurements that are optimum with respect to the accuracy of specified target parameters.

Figure 6:
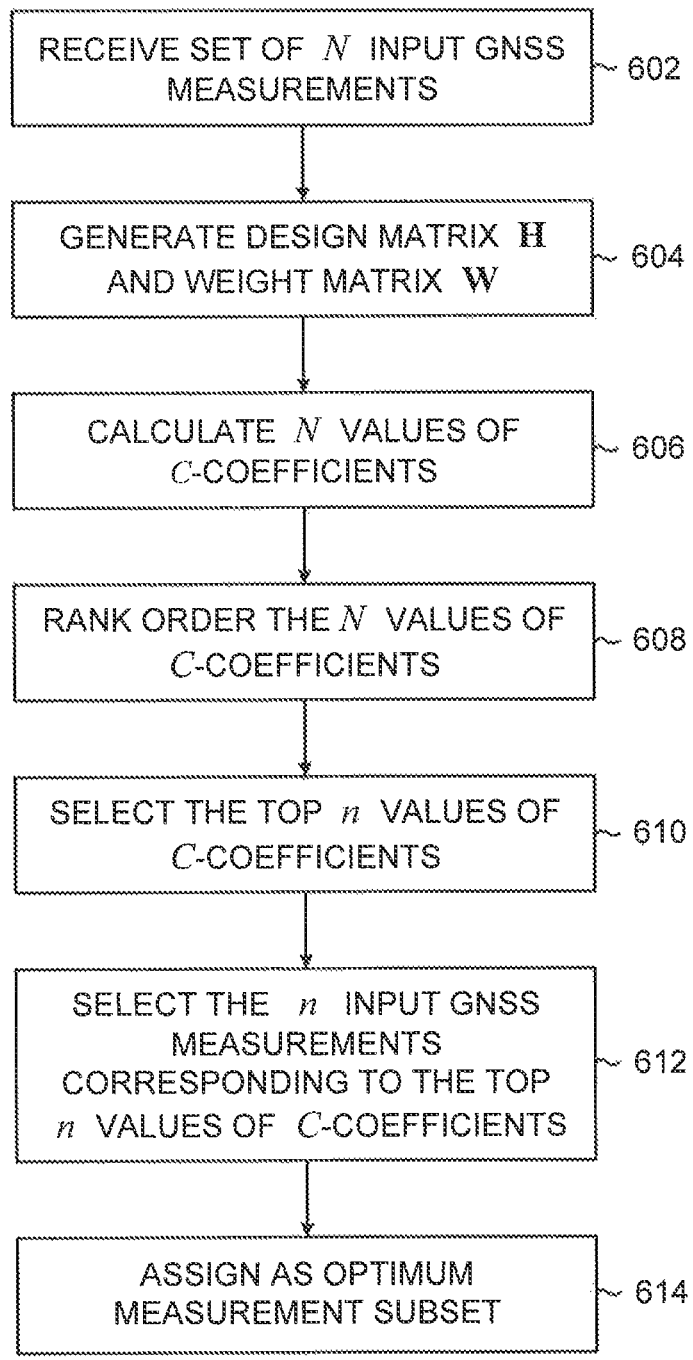
FIG. 6 shows a flowchart of a method, according to a first embodiment of the invention, for generating an optimum measurement subset.

FIG. 6 shows a flowchart of a method, according to an embodiment of the invention, for generating the optimum measurement subset from a set of input GNSS measurements. The set of input GNSS measurements has N elements, and the optimum measurement subset has n elements, where N is an integer and n is a specified integer, with n<N. An overview of the method is first presented, followed by details of some individual steps.

Since the method can accommodate various combinations of operational modes and measurements, the following terminology is used herein. "GNSS measurements" refer to code phase measurements or a combination of code phase measurements and carrier phase measurements. In a stand-alone mode, only GNSS measurements are available. In a differential navigation (DN) mode, if error correction data is available for the GNSS measurements, then the GNSS measurements are corrected with the error correction data to generate "corrected GNSS measurements", where "corrected GNSS measurements" refer to corrected code phase measurements or a combination of corrected code phase measurements and corrected carrier phase measurements. In a DN mode, however, it is possible that error correction data is available for some GNSS measurements, and error correction data is not available for other GNSS measurements. To cover the various combinations of operational modes and measurements, "input GNSS measurements" refer to GNSS measurements or corrected GNSS measurements or a combination of GNSS measurements and corrected GNSS measurements.

In step 602, the set of N input GNSS measurements is received, for example at the control and computing system 208 (FIG. 2). The process then passes to step 604, in which a design matrix H and a weight matrix W are generated for the N input GNSS measurements. The process then passes to step 606, in which N values of C-coefficients are calculated for the N input GNSS measurements (one C-coefficient corresponding to each input GNSS measurement).

The process then passes to step 608 in which the N values of C-coefficients are rank-ordered from the highest value (top) to the lowest value (bottom). The process then passes to step 610 in which the top n values of C-coefficients are selected. The process then passes to step 612 in which the n input GNSS measurements corresponding to the selected top n values of C-coefficients are selected. The process then passes to step 614, in which the selected n input GNSS measurements are assigned as the optimum measurement subset. Values of the target parameter are then calculated from the optimum measurement subset.

Details of step 604 and step 606 are now discussed.

In step 604, a design matrix H is generated. In general, the design matrix is a matrix of partial derivatives of measurements with respect to unknowns. As a specific example, if only single frequency pseudo-range measurements are available, and the Cartesian coordinates (x, y, z) of the user receiver in the ECEF reference frame are to be determined, the design matrix H can be expressed as a matrix of directional cosines augmented with a column of 1's:

$$H = \begin{bmatrix} h_x^1 & h_y^1 & h_z^1 & 1 \\ h_x^2 & h_y^2 & h_z^2 & 1 \\ \vdots & \vdots & \vdots & \vdots \\ h_x^s & h_x^s & h_x^s & 1 \\ \vdots & \vdots & \vdots & \vdots \\ h_x^{N_{sat}} & h_y^{N_{sat}} & h_z^{N_{sat}} & 1 \end{bmatrix}. \quad (E21)$$

Here, $h_x^s$, $h_y^s$, $h_z^s$ represent the directional cosines of the lines between the s-th satellite and the user receiver position with respect to reference Cartesian X, y, z axes, and $N_{sat}$ is the number of satellites in view.

In step 604, a weight matrix W is also generated. Each input GNSS measurement is associated with a corresponding measurement weight (a measurement weight is also referred to simply as a weight). In general, information concerning the measurement error associated with each input GNSS measurement is available, and the weight is at least partially dependent on the measurement error. Weights can be determined by various criteria. In one example, an input GNSS measurement from a satellite at a low elevation angle is assigned a lower weight than an input GNSS measurement from a satellite at a high elevation angle. In a second example, an input GNSS measurement from a signal with a low signal-to-noise ratio (SNR) is assigned a lower weight than an input GNSS measurement from a signal with a high SNR. In a third example, an input GNSS measurement from a signal with a low signal power is assigned a lower weight than an input GNSS measurement from a signal with a high signal power. In a fourth example, an input GNSS measurement from one satellite system (such as GLONASS) is assigned a lower weight than an input GNSS measurement from a second satellite system (such as GPS). Additional criteria can also be used for determining weights in a DN mode; for example, if error correction data is not available for all input GNSS measurements, then an input GNSS measurement with no corresponding error correction data is assigned a lower weight than an input GNSS measurement with corresponding error correction data. The weight can also depend on specific information in the error correction data. Combinations of criteria can also be used for determining weights.

In step 606, the N values of C-coefficients are calculated. For example, if the target parameters are the 3D Cartesian coordinates, then the C-coefficients are calculated according to (E19) above.

Figure 7A:
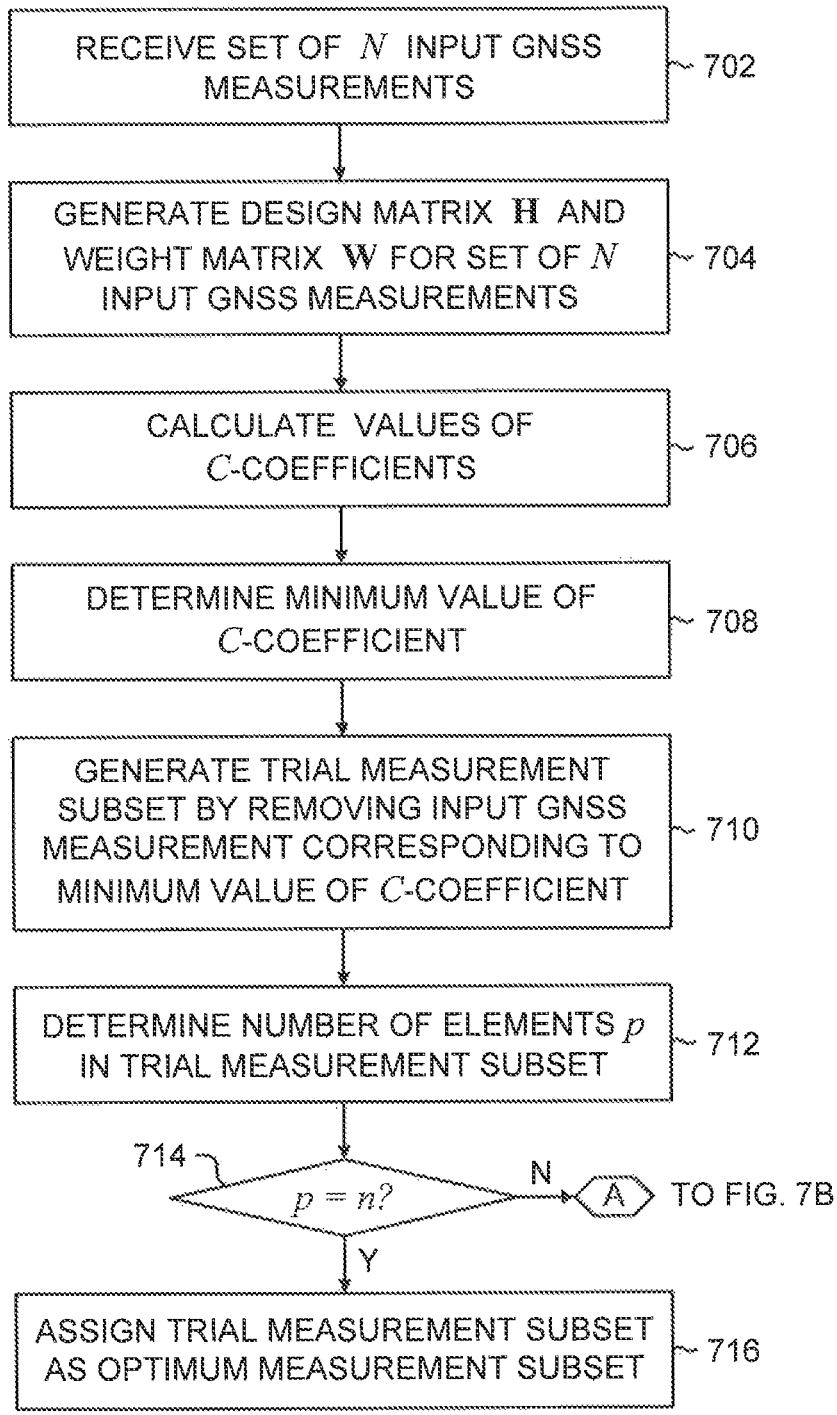
FIG. 7A and FIG. 7B show a flowchart of a method, according to a second embodiment of the invention, for generating an optimum measurement subset.
Figure 7B:
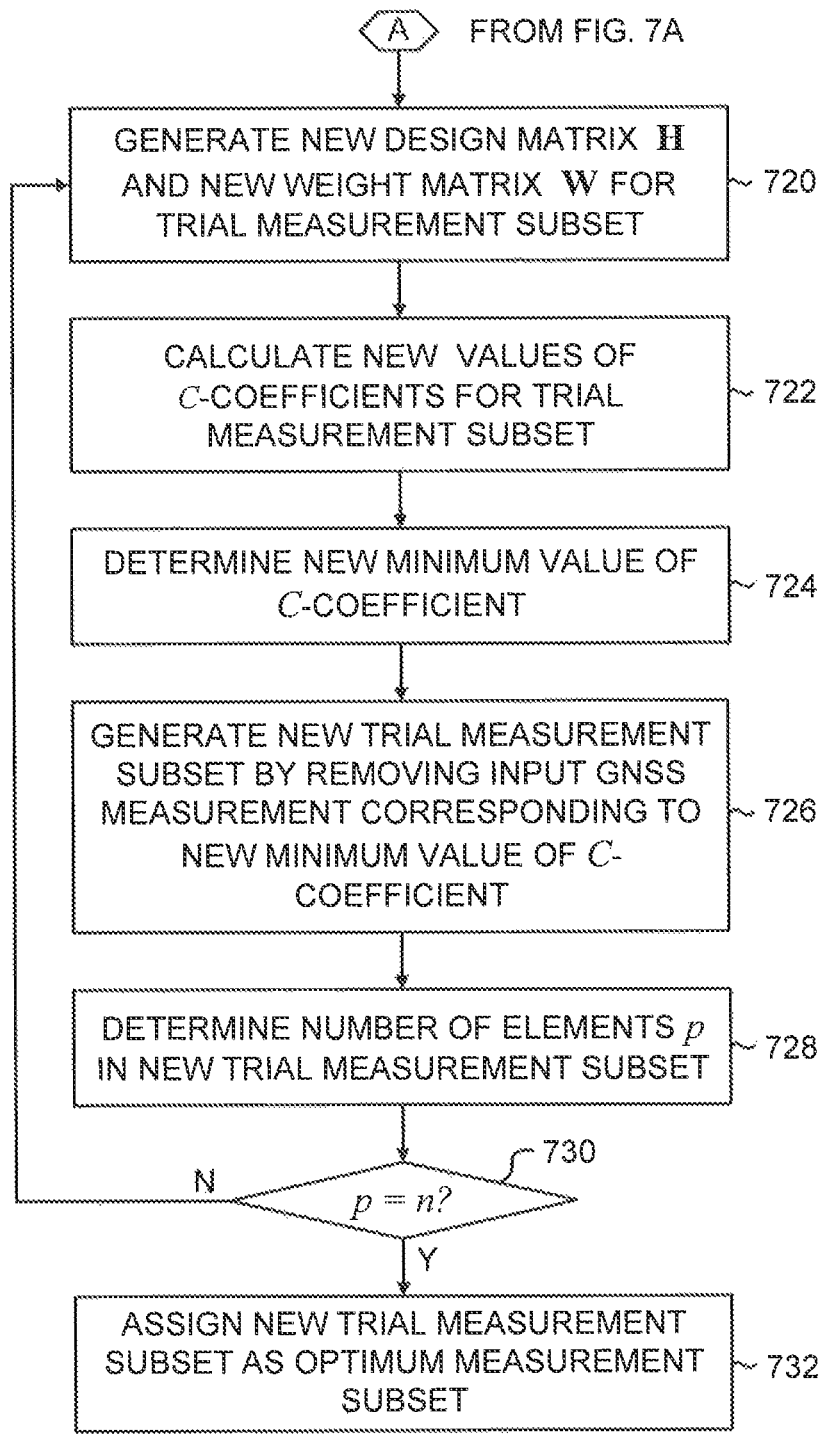

To evaluate the efficiency of the method described above, a simulation was performed for a case using GPS and GLONASS measurements. In each trial, GNSS measurements were selected according to two methods: the classical one based on analysis of the covariance matrix [(E4) and E5)], and the one based on analysis of the C-coefficients [E(19)]. The simulation results show that the measurements selected with the two different methods were the same in more than 91% of the trials. In the trials in which different measurements were selected by the different methods, positioning errors evaluated with the help of the solution covariance matrix (E4) were different by no more than 20 cm for the two methods (for a stand-alone mode of positioning). On average, the ratio of positioning errors evaluated with (E4) was 1.001 for the two methods. Thus, simulation confirms that results provided with the method based on the analysis of the C-coefficients for selecting the optimum measurement subset are very close to those provided with the classical one. At the same time, the method based on the analysis of the C-coefficients is substantially more economical in terms of computer power. It requires a computation time 10 to 70 times less than the computation time required for the classical method FIG. 7A and FIG. 7B show a flowchart of a method, according to another embodiment of the invention, for selecting the optimum measurement subset with n elements from a set of input GNSS measurements with N elements, where N is an integer and n is a specified integer, with n<N. [In FIG. 7A and FIG. 7B, the index "A" enclosed in a hexagon is used only to assist in aligning the sections of the flowchart. It does not refer to a drawing element; it is not used in the description; and it is not assigned a reference number.]

Refer to FIG. 7A. In step 702, the set of N input GNSS measurements is received, for example at the control and computing system 208 (FIG. 2). The process then passes to step 704, in which a design matrix H and a weight matrix W are generated for the set of N input GNSS measurements. The process then passes to step 706, in which N values of C-coefficients are calculated for the N input GNSS measurements (one C-coefficient corresponding to each input GNSS measurement).

The process then passes to step 708 in which the minimum value of the C-coefficient is determined. The process then passes to step 710 in which a trial measurement subset is generated by removing, from the set of N input GNSS measurements, the input GNSS measurement corresponding to the minimum value of the C-coefficient. The process then passes to step 712, in which the number of elements p in the trial measurement subset is determined.

The process then passes to the decision step 714. If the number of elements p in the trial measurement subset is equal to the specified integer n, then the process passes to step 716, in which the trial measurement subset is assigned as the optimum measurement subset. Values of the target parameters are then calculated from the optimum measurement subset.

Return to step 714. If the number of elements p in the trial measurement subset is not equal to the specified integer n, then the process passes to step 720 (FIG. 7B), in which a new design matrix H and a new weight matrix W are generated for the trial measurement subset. The process then passes to step 722, in which new values of C-coefficients are calculated for the trial measurement subset.

The process then passes to step 724, in which the new minimum value of the C-coefficient is determined. The process then passes to step 726, in which a new trial measurement subset is generated by removing, from the previous trial measurement subset, the input GNSS measurement corresponding to the new minimum value of the C-coefficient. The process then passes to step 728, in which the number of elements p in the new trial measurement subset is determined.

The process then passes to the decision step 730. If the number of elements p in the new trial measurement subset is equal to the specified integer n, then the process passes to step 732, in which the new trial measurement subset is assigned as the optimum measurement subset. Values of the target parameters are then calculated from the optimum measurement subset.

Return to step 730. If the number of elements p in the new trial measurement subset is not equal to the specified integer n, then the process returns to step 720 for another iteration. Step 720-step 730 are repeated until a trial measurement subset with n elements is attained.

In step 722, C-coefficients are calculated for a trial measurement subset in which the number of input GNSS measurements is reduced by one from the number of input GNSS measurements in the previous trial measurement subset. According to another embodiment, the C-coefficients can be calculated by an algorithm that avoids matrix inversions in contrast to the above embodiment in which the C-coefficients are directly recalculated using operations involving computationally intensive matrix inversions. The algorithm is based on recursive update of the vector of unknowns, sum of squared residuals, and solution covariance matrix, instead of their direct recalculation.

Assume it was decided to exclude the i-th measurement. The algorithm proceeds as follows:

$$h = H_{i,1:k}^T \quad (E22)$$

$$v = Ph \quad (E23)$$

$$C = \frac{1}{\frac{1}{W_{ii}^2} - h^T v} \quad (E24)$$

$$x_{(i)} = x - Cr_i v \quad (E25)$$

$$s_{(i)} = s - Cr_i^2 \quad (E26)$$

$$P_{(i)} = P - Cvv^T \quad (E27)$$

where:

$H_{i,1:k}$ is the i-th row of the H-matrix (for k unknowns);

$W_{ii}$ is the diagonal component of the weight W matrix, corresponding to the i-th measurement;

$X_{(i)}$, $S_{(i)}$, and $P_{(i)}$ are the vector of unknowns, the sum of squared residuals, and the solution covariance matrix, respectively, updated due to exclusion of the i-th measurement; and $r_i$ is the i-th component of the vector of residuals r.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for operating a navigation receiver by generating an optimum measurement subset from a set of input global navigation satellite system (GNSS) measurements, wherein the number of input GNSS measurements in the set of input GNSS measurements is a first integer, wherein the number of input GNSS measurements in the optimum measurement subset is a specified second integer, and wherein the specified second integer is less than the first integer, the method comprising the steps of:
receiving, by the navigation receiver, the set of input GNSS measurements;
generating, by the navigation receiver, a design matrix, wherein the design matrix is based at least in part on partial derivatives of the set of input GNSS measurements with respect to at least one target parameter, wherein the at least one target parameter is selected from the group consisting of:
a one-dimensional position;
a two-dimensional position;
a three-dimensional position; and
a time offset from a GNSS time;
generating, by the navigation receiver, a weight matrix, wherein the weight matrix is based at least in part on measurement errors associated with the set of input GNSS measurements;
calculating, by the navigation receiver, values of a set of coefficients, wherein each specific coefficient in the set of coefficients corresponds to a specific input GNSS measurement in the set of input GNSS measurements, and wherein the step of calculating values of a set of coefficients comprises the steps of, for each specific input GNSS measurement in the set of input GNSS measurements:
calculating, based at least in part on the design matrix and based at least in part on the weight matrix, a change in value of the at least one target parameter resulting from a change in value of the specific input GNSS measurement;
calculating, based at least in part on the design matrix and based at least in part on the weight matrix, a change in value of a sum of squared residuals resulting from a change in value of the specific input GNSS measurement; and
calculating the value of a specific coefficient as the ratio of the change in value of the at least one target parameter resulting from the change in value of the specific input GNSS measurement to the change in value of the sum of squared residuals resulting from the change in value of the specific input GNSS measurement; and
selecting, by the navigation receiver, the optimum measurement subset based at least in part on the values of the set of coefficients.

2. The method of claim 1, wherein the specified second integer is n, and wherein the step of selecting the optimum measurement subset based at least in part on the values of the set of coefficients comprises the steps of:
selecting, by the navigation receiver, a subset of n coefficients from the set of coefficients, wherein the subset of n coefficients corresponds to the n largest values of the coefficients in the set of coefficients; and
selecting, by the navigation receiver, as the optimum measurement subset the n input GNSS measurements corresponding to the subset of n coefficients.

3. The method of claim 1, wherein the specified second integer is n, and wherein the step of selecting the optimum measurement subset based at least in part on the values of the set of coefficients comprises:
performing the steps of:
determining a minimum value of coefficient based on the values of the set of coefficients;
determining the specific input GNSS measurement corresponding to the minimum value of coefficient;
generating a trial measurement subset by removing the specific input GNSS measurement from the set of input GNSS measurements; and
assigning the trial measurement subset as a current selected trial measurement subset; and
iteratively performing the steps of:
determining whether the number of input GNSS measurements in the current selected trial measurement subset is equal to n;
upon determining that the number of input GNSS measurements in the current selected trial measurement subset is equal to n:
assigning the current selected trial measurement subset as the optimum measurement subset; and
upon determining that the number of input GNSS measurements in the current selected trial measurement subset is not equal to n:
generating a new design matrix, wherein the new design matrix is based at least in part on partial derivatives of the current selected trial measurement subset with respect to the at least one target parameter;
generating a new weight matrix, wherein the new weight matrix is based at least in part on measurement errors associated with the current selected trial measurement subset;
calculating values of a new set of coefficients, wherein each specific coefficient in the new set of coefficients corresponds to a specific input GNSS measurement in the current selected trial measurement subset, and wherein the step of calculating values of a new set of coefficients comprises the steps of, for each specific input GNSS measurement in the current selected trial measurement subset:
calculating a change in value of the at least one target parameter resulting from a change in value of the specific input GNSS measurement;
calculating a change in value of the sum of squared residuals resulting from a change in value of the specific input GNSS measurement; and
calculating the value of the new specific coefficient as the ratio of the change in value of the at least one target parameter resulting from the change in value of the specific input GNSS measurement to the change in value of the sum of squared residuals resulting from the change in value of the specific input GNSS measurement;
determining a new minimum value of coefficient based on the values of the new set of coefficients;
determining the specific input GNSS measurement corresponding to the new minimum value of coefficient;
generating a new trial measurement subset by removing the specific input GNSS measurement from the current selected trial measurement subset; and
assigning the new trial measurement subset as the current selected trial measurement subset.

4. The method of claim 3, wherein the step of calculating values of a new set of coefficients is based on a recursive update of:
a vector of unknowns;
the sum of squared residuals; and
a solution covariance matrix;
wherein the recursive update is performed without matrix inversions.

5. The method of claim 1, further comprising the step of:
calculating, by the navigation receiver, a value of the at least one target parameter based on the optimum measurement subset.

6. An apparatus for generating an optimum measurement subset from a set of input global navigation satellite system (GNSS) measurements, wherein the number of input GNSS measurements in the set of input GNSS measurements is a first integer, wherein the number of input GNSS measurements in the optimum measurement subset is a specified second integer, and wherein the specified second integer is less than the first integer, the apparatus comprising:
means for receiving the set of input GNSS measurements;
means for generating a design matrix, wherein the design matrix is based at least in part on partial derivatives of the set of input GNSS measurements with respect to at least one target parameter, wherein the at least one target parameter is selected from the group consisting of:
a one-dimensional position;
a two-dimensional position;
a three-dimensional position; and
a time offset from a GNSS time;
means for generating a weight matrix, wherein the weight matrix is based at least in part on measurement errors associated with the set of input GNSS measurements;
means for calculating values of a set of coefficients, wherein each specific coefficient in the set of coefficients corresponds to a specific input GNSS measurement in the set of input GNSS measurements, and wherein the means for calculating values of a set of coefficients comprises means for, for each specific input GNSS measurement in the set of input GNSS measurements:
calculating, based at least in part on the design matrix and based at least in part on the weight matrix, a change in value of the at least one target parameter resulting from a change in value of the specific input GNSS measurement;
calculating, based at least in part on the design matrix and based at least in part on the weight matrix, a change in value of a sum of squared residuals resulting from a change in value of the specific input GNSS measurement; and
calculating the value of a specific coefficient as the ratio of the change in value of the at least one target parameter resulting from the change in value of the specific input GNSS measurement to the change in value of the sum of squared residuals resulting from the change in value of the specific input GNSS measurement; and
means for selecting the optimum measurement subset based at least in part on the values of the set of coefficients.

7. The apparatus of claim 6, wherein the specified second integer is n, and wherein the means for selecting the optimum measurement subset based at least in part on the values of the set of coefficients comprises:
means for selecting a subset of n coefficients from the set of coefficients, wherein the subset of n coefficients corresponds to the n largest values of the coefficients in the set of coefficients; and
means for selecting as the optimum measurement subset the n input GNSS measurements corresponding to the subset of n coefficients.

8. The apparatus of claim 6, wherein the specified second integer is n, and wherein the means for selecting the optimum measurement subset based at least in part on the values of the set of coefficients comprises:
means for performing the steps of:
determining a minimum value of coefficient based on the values of the set of coefficients;
determining the specific input GNSS measurement corresponding to the minimum value of coefficient;
generating a trial measurement subset by removing the specific input GNSS measurement from the set of input GNSS measurements; and
assigning the trial measurement subset as a current selected trial measurement subset; and
means for iteratively performing the steps of:
determining whether the number of input GNSS measurements in the current selected trial measurement subset is equal to n;
upon determining that the number of input GNSS measurements in the current selected trial measurement subset is equal to n:
assigning the current selected trial measurement subset as the optimum measurement subset; and
upon determining that the number of input GNSS measurements in the current selected trial measurement subset is not equal to n:
generating a new design matrix, wherein the new design matrix is based at least in part on partial derivatives of the current selected trial measurement subset with respect to the at least one target parameter;
generating a new weight matrix, wherein the new weight matrix is based at least in part on measurement errors associated with the current selected trial measurement subset;
calculating values of a new set of coefficients, wherein each specific coefficient in the new set of coefficients corresponds to a specific input GNSS measurement in the current selected trial measurement subset, and wherein the step of calculating values of a new set of coefficients comprises the steps of, for each specific input GNSS measurement in the current selected trial measurement subset:
calculating a change in value of the at least one target parameter resulting from a change in value of the specific input GNSS measurement;
calculating a change in value of the sum of squared residuals resulting from a change in value of the specific input GNSS measurement; and
calculating the value of the new specific coefficient as the ratio of the change in value of the at least one target parameter resulting from the change in value of the specific input GNSS measurement to the change in value of the sum of squared residuals resulting from the change in value of the specific input GNSS measurement;
determining a new minimum value of coefficient based on the values of the new set of coefficients;
determining the specific input GNSS measurement corresponding to the new minimum value of coefficient;
generating a new trial measurement subset by removing the specific input GNSS measurement from the current selected trial measurement subset; and
assigning the new trial measurement subset as the current selected trial measurement subset.

9. The apparatus of claim 8, wherein the step of calculating values of a new set of coefficients is based on a recursive update of:
   a vector of unknowns;
   the sum of squared residuals; and
   a solution covariance matrix;
   wherein the recursive update is performed without matrix inversions.

10. The apparatus of claim 6, further comprising:
   means for calculating a value of the at least one target parameter based on the optimum measurement subset.

11. A computer readable medium storing computer program instructions for operating a navigation receiver by generating an optimum measurement subset from a set of input global navigation satellite system (GNSS) measurements, wherein the number of input GNSS measurements in the set of input GNSS measurements is a first integer, wherein the number of input GNSS measurements in the optimum measurement subset is a specified second integer, and wherein the specified second integer is less than the first integer, the computer program instructions defining the steps of:
   receiving, by the navigation receiver, the set of input GNSS measurements;
   generating, by the navigation receiver, a design matrix, wherein the design matrix is based at least in part on partial derivatives of the set of input GNSS measurements with respect to at least one target parameter, wherein the at least one target parameter is selected from the group consisting of:
      a one-dimensional position;
      a two-dimensional position;
      a three-dimensional position; and
      a time offset from a GNSS time;
   generating, by the navigation receiver, a weight matrix, wherein the weight matrix is based at least in part on measurement errors associated with the set of input GNSS measurements;
   calculating, by the navigation receiver, values of a set of coefficients, wherein each specific coefficient in the set of coefficients corresponds to a specific input GNSS measurement in the set of input GNSS measurements, and wherein the step of calculating values of a set of coefficients comprises the steps of, for each specific input GNSS measurement in the set of input GNSS measurements:
      calculating, based at least in part on the design matrix and based at least in part on the weight matrix, a change in value of the at least one target parameter resulting from a change in value of the specific input GNSS measurement;
      calculating, based at least in part on the design matrix and based at least in part on the weight matrix, a change in value of a sum of squared residuals resulting from a change in value of the specific input GNSS measurement; and
      calculating the value of a specific coefficient as the ratio of the change in value of the at least one target parameter resulting from the change in value of the specific input GNSS measurement to the change in value of the sum of squared residuals resulting from the change in value of the specific input GNSS measurement; and
   selecting, by the navigation receiver, the optimum measurement subset based at least in part on the values of the set of coefficients.

12. The computer readable medium of claim 11, wherein the specified second integer is n, and wherein computer program instructions defining the step of selecting the optimum measurement subset based at least in part on the values of the set of coefficients comprises computer program instructions defining the steps of:
   selecting, by the navigation receiver, a subset of n coefficients from the set of coefficients, wherein the subset of n coefficients corresponds to the n largest values of the coefficients in the set of coefficients; and
   selecting, by the navigation receiver, as the optimum measurement subset the n input GNSS measurements corresponding to the subset of n coefficients.

13. The computer readable medium of claim 11, wherein the specified second integer is n, and wherein the computer program instructions defining the step of selecting the optimum measurement subset based at least in part on the values of the set of coefficients comprise computer program instructions defining:
   performing the steps of:
      determining a minimum value of coefficient based on the values of the set of coefficients;
      determining the specific input GNSS measurement corresponding to the minimum value of coefficient;
      generating a trial measurement subset by removing the specific input GNSS measurement from the set of input GNSS measurements; and
      assigning the trial measurement subset as a current selected trial measurement subset; and
   iteratively performing the steps of:
      determining whether the number of input GNSS measurements in the current selected trial measurement subset is equal to n;
      upon determining that the number of input GNSS measurements in the current selected trial measurement subset is equal to n:
         assigning the current selected trial measurement subset as the optimum measurement subset; and
      upon determining that the number of input GNSS measurements in the current selected trial measurement subset is not equal to n:
         generating a new design matrix, wherein the new design matrix is based at least in part on partial derivatives of the current selected trial measurement subset with respect to the at least one target parameter;
         generating a new weight matrix, wherein the new weight matrix is based at least in part on measurement errors associated with the current selected trial measurement subset;
         calculating values of a new set of coefficients, wherein each specific coefficient in the new set of coefficients corresponds to a specific input GNSS measurement in the current selected trial measurement subset, and wherein the step of calculating values of a new set of coefficients comprises the steps of, for each specific input GNSS measurement in the current selected trial measurement subset:
            calculating a change in value of the at least one target parameter resulting from a change in value of the specific input GNSS measurement;
            calculating a change in value of the sum of squared residuals resulting from a change in value of the specific input GNSS measurement; and
            calculating the value of the new specific coefficient as the ratio of the change in value of the at least one target parameter resulting from the change in value of the specific input GNSS measurement to the change in value of the sum of squared residuals resulting from the change in value of the specific input GNSS measurement;

determining a new minimum value of coefficient based on the values of the new set of coefficients;

determining the specific input GNSS measurement corresponding to the new minimum value of coefficient;

generating a new trial measurement subset by removing the specific input GNSS measurement from the current selected trial measurement subset; and assigning the new trial measurement subset as the current selected trial measurement subset.

14. The computer readable medium of claim 13, wherein the step of calculating values of a new set of coefficients is based on a recursive update of:

a vector of unknowns;

the sum of squared residuals; and a solution covariance matrix;

wherein the recursive update is performed without matrix inversions.

15. The computer readable medium of claim 11, wherein the computer program instructions further comprise computer program instructions defining the step of:

calculating, by the navigation receiver, a value of the at least one target parameter based on the optimum measurement subset.

* * * * *